United States Patent
Dodson et al.

(10) Patent No.: US 11,621,969 B2
(45) Date of Patent: Apr. 4, 2023

(54) CLUSTERING AND OUTLIER DETECTION IN ANOMALY AND CAUSATION DETECTION FOR COMPUTING ENVIRONMENTS

(71) Applicant: Elasticsearch B.V., Mountain View, CA (US)

(72) Inventors: Stephen Dodson, London (GB); Thomas Veasey, York (GB)

(73) Assignee: ELASTICSEARCH B.V., Amsterdam (NL)

( * ) Notice: Subject to any disclaimer, the term of this patent is extended or adjusted under 35 U.S.C. 154(b) by 899 days.

(21) Appl. No.: 15/857,186

(22) Filed: Dec. 28, 2017

(65) Prior Publication Data

US 2018/0316707 A1 Nov. 1, 2018

Related U.S. Application Data

(63) Continuation-in-part of application No. 15/498,406, filed on Apr. 26, 2017, now Pat. No. 10,986,110.

(51) Int. Cl.
*H04L 9/40* (2022.01)
*G06N 5/025* (2023.01)
(Continued)

(52) U.S. Cl.
CPC .......... *H04L 63/1425* (2013.01); *G06F 7/483* (2013.01); *G06F 16/285* (2019.01);
(Continued)

(58) Field of Classification Search
CPC .................... G06N 20/00; G06N 5/025; G06F 2207/4818; G06F 16/285; G06F 7/483;
(Continued)

(56) References Cited

U.S. PATENT DOCUMENTS 6,012,152 A 1/2000 Douik et al.
7,280,988 B2 10/2007 Helsper et al.
(Continued)

FOREIGN PATENT DOCUMENTS

EP 3616062 A1 3/2020
EP 3616096 A1 3/2020
(Continued)

OTHER PUBLICATIONS

Rémi Domingues et al, "Machine Learning for Unsupervised Fraud Detection", Stockholm, Sweden 2015, KTH Royal Institute of Technology School of Computer Science and Communication, Second Cycle (Year: 2015).*
(Continued)

*Primary Examiner* — Michael J Huntley
*Assistant Examiner* — Imad Kassim
(74) *Attorney, Agent, or Firm* — Quinn IP Law

(57) ABSTRACT

Clustering and outlier detection in anomaly and causation detection for computing environments is disclosed. An example method includes receiving an input stream having data instances, each of the data instances having multi-dimensional attribute sets, identifying any of outliers and singularities in the data instances, extracting the outliers and singularities, grouping two or more of the data instances into one or more groups based on correspondence between the multi-dimensional attribute sets and a clustering type, and displaying the grouped data instances that are not extracted in a plurality of clustering maps on an interactive graphical user interface, wherein each of the plurality of clustering maps is based on a unique clustering type.

20 Claims, 15 Drawing Sheets

(51) Int. Cl.
*G06F 7/483* (2006.01)
*G06F 16/28* (2019.01)
*H04L 43/16* (2022.01)
*H04L 41/14* (2022.01)
*H04L 41/147* (2022.01)
*H04L 41/22* (2022.01)
*H04L 41/5019* (2022.01)
*H04L 43/0876* (2022.01)
*G06N 20/00* (2019.01)

(52) U.S. Cl.
CPC ........... *G06N 5/025* (2013.01); *H04L 41/145* (2013.01); *H04L 41/147* (2013.01); *H04L 43/16* (2013.01); *H04L 63/1416* (2013.01); *G06F 2207/4818* (2013.01); *G06N 20/00* (2019.01); *H04L 41/22* (2013.01); *H04L 41/5019* (2013.01); *H04L 43/0876* (2013.01)

(58) Field of Classification Search
CPC ... H04L 63/1425; H04L 43/16; H04L 41/145; H04L 41/147; H04L 63/1416; H04L 41/22; H04L 41/5019; H04L 43/0876
See application file for complete search history.

(56) References Cited

U.S. PATENT DOCUMENTS

| | | | |
|---|---|---|---|
| 7,310,590 | B1 | 12/2007 | Bansal |
| 7,451,210 | B2 | 11/2008 | Gupta et al. |
| 7,539,593 | B2 | 5/2009 | Machacek |
| 7,881,535 | B1 | 2/2011 | McLaughlin et al. |
| 8,027,439 | B2 | 9/2011 | Zoldi et al. |
| 8,324,260 | B1 | 12/2012 | Garcia da Rocha et al. |
| 9,038,172 | B2 * | 5/2015 | Miller ................. H04L 63/1425 726/22 |
| 9,224,067 | B1 | 12/2015 | Lu et al. |
| 9,314,449 | B2 | 4/2016 | Garcia da Rocha et al. |
| 9,407,651 | B2 | 8/2016 | Mathis |
| 9,516,053 | B1 | 12/2016 | Sudhakar et al. |
| 10,986,110 | B2 | 4/2021 | Dodson et al. |
| 11,017,330 | B2 | 5/2021 | Dodson |
| 2001/0000192 | A1 | 4/2001 | Gonzalez et al. |
| 2003/0065409 | A1 | 4/2003 | Raeth et al. |
| 2003/0101076 | A1 | 5/2003 | Zaleski |
| 2005/0080806 | A1 | 4/2005 | Doganata et al. |
| 2006/0020924 | A1 | 1/2006 | Lo et al. |
| 2006/0167917 | A1 | 7/2006 | Solomon |
| 2008/0021994 | A1 | 1/2008 | Grelewicz et al. |
| 2008/0071638 | A1 | 3/2008 | Wanker |
| 2008/0114725 | A1 | 5/2008 | Indeck et al. |
| 2009/0077663 | A1 | 3/2009 | Sun et al. |
| 2009/0106178 | A1 | 4/2009 | Chu |
| 2009/0177692 | A1 | 7/2009 | Chagoly et al. |
| 2009/0254312 | A1 | 10/2009 | Kube et al. |
| 2011/0078106 | A1 | 3/2011 | Luchi et al. |
| 2011/0145400 | A1 | 6/2011 | Dodson |
| 2012/0137367 | A1 | 5/2012 | Dupont et al. |
| 2013/0031130 | A1 | 1/2013 | Hahm |
| 2013/0198206 | A1 | 8/2013 | Jones |
| 2013/0238476 | A1 | 9/2013 | Green |
| 2013/0262347 | A1 | 10/2013 | Dodson |
| 2013/0325584 | A1 | 12/2013 | Bogaty et al. |
| 2013/0326620 | A1 | 12/2013 | Merza et al. |
| 2014/0006330 | A1 | 1/2014 | Biem |
| 2014/0108640 | A1 | 4/2014 | Mathis |
| 2015/0047026 | A1 | 2/2015 | Neil et al. |
| 2015/0058982 | A1 | 2/2015 | Eskin et al. |
| 2015/0082437 | A1 | 3/2015 | Dodson |
| 2015/0180894 | A1 | 6/2015 | Sadovsky et al. |
| 2015/0235312 | A1 | 8/2015 | Dodson |
| 2015/0302310 | A1 | 10/2015 | Wernevi et al. |
| 2015/0339600 | A1 | 11/2015 | Dodson |
| 2016/0055654 | A1 | 2/2016 | Flanders et al. |
| 2016/0142435 | A1 | 5/2016 | Bernstein et al. |
| 2016/0226901 | A1 | 8/2016 | Baikalov et al. |
| 2017/0063910 | A1 | 3/2017 | Muddu et al. |
| 2017/0148096 | A1 | 5/2017 | Dodson |
| 2018/0173698 | A1 | 6/2018 | Dubey et al. |
| 2018/0314835 | A1 | 11/2018 | Dodson et al. |
| 2018/0314965 | A1 | 11/2018 | Dodson et al. |
| 2021/0194910 | A1 | 6/2021 | Dodson et al. |

FOREIGN PATENT DOCUMENTS

| | | |
|---|---|---|
| WO | WO2012154657 A2 | 11/2012 |
| WO | WO2018200111 A1 | 11/2018 |
| WO | WO2018200112 A1 | 11/2018 |
| WO | WO2018200113 A1 | 11/2018 |

OTHER PUBLICATIONS

Maria Riveiro et al. "Improving maritime anomaly detection and situation awareness through interactive visualization", IEEE Xplore, Sep. 26, 2008 (Year: 2008).*

Zhang, "Sliding Window-Based Fault Detection From High-Dimensional Data Streams", IEEE Transactions on Systems, Man, and Cybernetics: Systems, vol. 47, No. 2, Feb. 2017 (Year: 2017).*

Ye at al. ("Projected outlier detection in high-dimensional mixed-attributes data set", Expert Systems with Applications 36 (2009) 7104-7113) (Year: 2009).*

Ye et al. ("Continuous Angle-based Outlier Detection on High-dimensional Data Streams", IDEAS '15, Jul. 13-15, 2015, Yokohama, Japan) (Year: 2015).*

Kriegel et al. ("Angle-Based Outlier Detection in High-dimensional Data", KDD'08, Aug. 24-27, 2008, pp. 444-452) (Year: 2008).*

Milller et al. ("Statistical Selection of Relevant Subspace Projections for Outlier Ranking", 2011 IEEE, pp. 434-445) (Year: 2011).*

Juvonen et al. ("Online anomaly detection using dimensionality reduction techniques for HTTP log analysis", vol. 91, Nov. 14, 2015, pp. 46-56) (Year: 2015).*

Meilă, Marina, "Comparing Clustering—An Information Based Distance," Journal of Multivariate Analysis 98, 2007, pp. 873-895.

"International Search Report" and "Written Opinion of the International Searching Authority," Patent Cooperation Treaty Application No. PCT/US2018/024660, dated Jun. 26, 2018, 9 pages.

Domingues, Remi, "Machine Learning for Unsupervised Fraud Detection," Royal Institute of Technology, School of Computer Scienece and Communication, KTH CSC, SE-100 44 Stockholm, Sweden, 2015 [retrieved on May 21, 2018], Retrieved from the Internet: <URL:http://www.diva-portal.org/smash/get/diva2:897808/FULLTEXT01.pdf>, 66 pages.

"International Search Report" and "Written Opinion of the International Searching Authority," Patent Cooperation Treaty Application No. PCT/US2018/024671, dated Jul. 27, 2018, 15 pages.

Chandola, Varun et al., "Anomaly Detection: A Survey," ACM Computing Surveys, Aug. 15, 2007, pp. 1-72, Retrieved from the Internet: <URL:http://www.cs.umn.edu/sites/cs.umn.edu/files/tech_reports/07-017.pdf>.

"International Search Report" and "Written Opinion of the International Searching Authority," Patent Cooperation Treaty Application No. PCT/US2018/024613, dated Jun. 1, 2018, 10 pages.

"Extended European Search Report", European Patent Application 18790780.3, dated Sep. 10, 2020, 6 pages.

Soule et al., "Combining Filtering and Statistical Methods for Anomaly Detection", USENIX, The Advanced Computing Systems Association, Oct. 24, 2005, pp. 1-14.

"Extended European Search Report", European Patent Application 18791513.7, dated Sep. 14, 2020, 9 pages.

Domingues et al., "Machine Learning for Unsupervised Fraud Detection", Stockholm, Sweden 2015, Kth Royal Institute of Technology School of Computer Science and Communication, Second Cycle (Year: 2015), 66 pages.

Riveiro et al., "Improving maritime anomaly detection and situation awareness through interactive visualization", IEEE Xplore, Sep. 26, 2008, 8 pages.

Spiliopoulou et al., "MONIC—Modeling and Monitoring Cluster Transitions", ACM, KDD'06, Aug. 20-23, 2006, 6 pages.

(56) References Cited

OTHER PUBLICATIONS

"Office Action", European Patent Application No. 18791513.7, dated Mar. 8, 2022, 4 pages.

* cited by examiner

CLUSTERING AND OUTLIER DETECTION IN ANOMALY AND CAUSATION DETECTION FOR COMPUTING ENVIRONMENTS

CROSS REFERENCE TO RELATED APPLICATIONS

This application is a continuation-in-part of U.S. application Ser. No. 15/498,406, filed on Apr. 26, 2017, which is hereby incorporated by reference herein in its entirety, including all references and appendices cited therein, for all purposes. This application is also related to U.S. application Ser. No. 14/717,028, filed on May 20, 2015, which is hereby incorporated by reference herein in its entirety, including all references and appendices cited therein, for all purposes.

FIELD OF THE PRESENT TECHNOLOGY

The present technology relates generally to digital security, and more particularly, but not by limitation, to systems and methods that process multi-dimensional attribute sets to provide clustering and outlier detection and extraction as disclosed in greater detail herein.

SUMMARY

Various embodiments of the present technology include a method comprising applying a vector value function $f: S \rightarrow \mathcal{V}$ for $\mathcal{V} \in \mathbb{R}^n$ to multi-dimensional attribute sets of data instances to create feature vectors; automatically normalizing each of the multi-dimensional attribute sets of feature vectors corresponding to the data instances using, for example, median absolute deviation (MAD) within a dimension; computing a collection of multiple affine random projections of the feature vectors; performing outlier detection on each of the data instances by applying one or more normalized measures of outlier factors to the projected feature vectors; associating a weight to each pair comprising a projection and a normalized measure and using these to generate an overall measure of outlier-ness; training a rule based classifier using the labeling generated by applying a threshold to the overall outlier-ness; and applying the rule based classifier to the data instances to automatically determine outliers in the data instances.

Various embodiments of the present technology include a method for comprising: receiving an input stream having data instances (some of which are), each of the data instances having multi-dimensional attribute sets, identifying and removing any of outliers and singularities in the data instances, extracting the outliers and singularities, grouping two or more of the data instances into one or more groups based on correspondence between the multi-dimensional attribute sets, and displaying the grouped data instances that are not extracted in a plurality of clustering maps on an interactive graphical user interface, wherein each of the plurality of clustering maps is based on a unique clustering type.

Various embodiments of the present technology include a system comprising: (a) a processor; and (b) a memory for storing executable instructions, the processor executing the instructions to receive an input stream having data instances, each of the data instances having multi-dimensional attribute sets, identify or remove any of outliers and singularities in the data instances, extract the outliers and singularities, group two or more of the data instances into one or more groups based on correspondence or matching between the multi-dimensional attribute sets; and display the grouped data instances that are not extracted in a plurality of clustering maps on an interactive graphical user interface, wherein each of the plurality of clustering maps is based on a unique clustering type.

BRIEF DESCRIPTION OF THE DRAWINGS

Certain embodiments of the present technology are illustrated by the accompanying figures. It will be understood that the figures are not necessarily to scale and that details not necessary for an understanding of the technology or that render other details difficult to perceive may be omitted. It will be understood that the technology is not necessarily limited to the particular embodiments illustrated herein.

DETAILED DESCRIPTION

The present disclosure is directed to various embodiments of systems and methods that use unsupervised machine learning to detect anomalous activity and isolate a source or sources thereof. In more detail, an input stream of data instances is received. The input stream can include data instances of behavior or activity of a computer environment. Generally, a computer environment can include an individual computing system as well as a plurality of computers or other computing devices such as a network. The input stream can be obtained from any method that would be known to one skilled in the art.

In various embodiments, the data instances are obtained over a period of time and each of the data instances are time stamped. Various analyses described herein examine the data instances over all or a portion of the period of time for which the input stream is collected. Anomalies can be detected within this input stream by examining and comparing principal values (or at least one principal value) and their corresponding categorical attributes as they changed over time. These changes are identified as anomalies, according to various embodiments. Further inspection of the anomalies may confirm or eliminate the anomalies as indicative of malicious behavior or other computing environment issues.

In accordance with various embodiments of the present disclosure, when an anomaly is detected, a cause or causes of the anomaly are located through a process of counterfactual processing. An exemplary process of counterfactual processing uses reductionism and elimination to isolate principal values and/or corresponding categorical attributes that contribute to the anomaly. In various embodiments, these anomalous principal values and/or corresponding categorical attributes are then traced back to a source such as a user, a computing system, a network component, or the like (generally referred to as a source point). This source point can then be identified and flagged for further review. In some embodiments, the source point is automatically remediated. For example, if the source point is a computing system and the anomaly that is detected is a spike in traffic between the computing system and a foreign server, the remediation can comprise automatically blocking network access for the computing system until a full review of the computing system has been conducted.

These and other advantages of the present technology are provided below with reference to the collective drawings.

Figure 1:
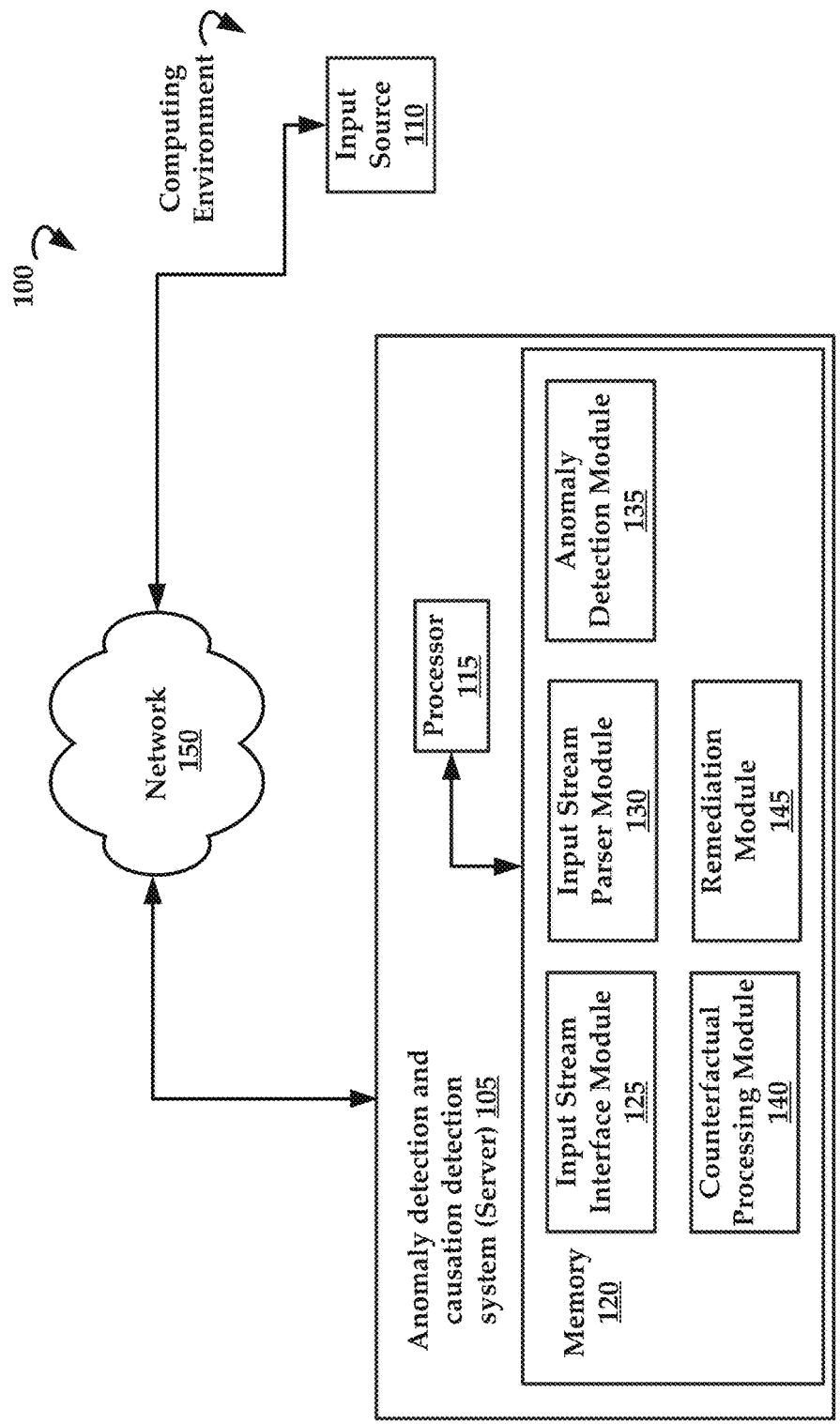
FIG. 1 is a high level schematic diagram of computing architecture for practicing aspects of the present technology.

FIG. 1 is a high level schematic diagram of an exemplary computing architecture (hereinafter architecture 100) of the present technology. The exemplary architecture 100 comprises an exemplary anomaly detection and causation detection system 105 (hereinafter also referred to as exemplary system 105 or system 105 for short), which in some embodiments comprises a server or cloud-based computing device configured specifically to perform the analyses described herein. That is, the system 105 in some embodiments is a particular purpose computing device that is specifically designed and programmed (e.g., configured or adapted) to perform any of the methods described herein. The system 105 can also comprise a plurality of distributed computing systems that cooperatively provide the features of the system 105. For example, individual ones of the plurality of distributed computing systems can provide one or more unique functions or services. In some embodiments, the system 105 can comprise a cloud computing environment or other similar networked computing system.

The system 105 can be coupled with an input source 110 that provides an input stream to the system 105. An input source 110 can comprise, for example, a computing system, an enterprise network, a plurality of computing systems arranged as a network, virtual machines, application(s), network tap(s), services, a cloud, containers, or other similar computing environment that creates data instances. In some embodiments, the input source 110 comprises a database or data store that stores pre-obtained data from any of the aforementioned sources for use in accordance with the present disclosure.

In one embodiment, the system 105 comprises a processor 115 and memory 120 for storing instructions. The memory 120 can include an input stream interface module 125, an input stream parser module 130, an anomaly detection module 135, a counterfactual processing module 140, and a remediation module 145. As used herein, the terms "module" may also refer to any of an application-specific integrated circuit ("ASIC"), an electronic circuit, a processor (shared, dedicated, or group) that executes one or more software or firmware programs, a combinational logic circuit, and/or other suitable components that provide the described functionality.

In some embodiments, the system 105 receives an input stream from the input source 110 via the input stream interface module 125. An input stream may include a plurality of data instances that are collected over a period of time. The individual data instances (or components thereof) may be time stamped so that a chronological order can be maintained for the data instances.

In some embodiments, using unsupervised machine learning, the exemplary system 105 can evaluate the data instances over time to detect anomalous behavior. In general, anomalous behavior can include any deviation in the data instances as viewed over time. For example, if the data instances are collected for a network such as a cloud, changes in resource utilization of a service within the cloud can be identified as anomalous. In another example, a brief spike in file transfer rates between a computing device and another computing device (possibly in a foreign country) can be flagged as anomalous. The present disclosure is not intended to be limited to unsupervised machine learning and in some embodiments can incorporate other machine learning methods. In one embodiment, user feedback can be incorporated into an anomaly score via supervised machine learning techniques, or at least partially supervised or a mixture that is based on how unusual the deviation/anomaly is relative to models of historical behavior of the system 105, as well as how it compares to other anomaly instances that have been indicated as important.

The use of unsupervised machine learning in various embodiments allows the system 105 to evaluate only the data instances available and examine these data instances for anomalous behavior in a self-referential manner. That is, in various embodiments, the data instances are modeled for the time period for which data instances are collected and these data instances are used without referencing pre-generated behavior profiles or other similar profiles. The use of pre-generated behavior profiles may be advantageous in some embodiments, if available, but these profiles are not required.

Changes in data instances over time can be flagged as anomalous if the changes have a magnitude that is unexpected. The exemplary system 105 need not rely on rigid thresholds or rules for determining if changes in the data instances are anomalous, but such information can be used to confirm or validate the anomaly. In some embodiments, the system 105 can calculate a probability of a current behavior based on historical behavior, where low probability events are classified as anomalies. Again, the use of thresholds or rules is not required, but is also not prohibited.

In various embodiments, each data instance is comprised of at least one principal value that represents an aspect or object of the computing environment that is to be measured for anomalies. Non-limiting examples of principal values include network traffic volume, memory access and/or usage, processor usage rates, file transfer, file access, device access, and so forth. In various embodiments, the at least one principal values selected can be a subset of all available principal values in the data instances. The principal values selected for the data instances can be user-selected or user-defined, or can be based on prior knowledge, such as prior instances of anomalous network activity. For example, if prior anomalies in increased CPU usage in a cloud were linked to malicious behavior, the principal values could include CPU usage aspects.

In other embodiments, the data instances can be selected based on pre-defined understanding of the data type, or automatically by the system 105 based on data characteristics.

In some embodiments, a principle value comprises corresponding categorical attributes and values thereof. In one example, if the principle value is "log on time", categorical attributes could include users, system ID, login locations, and so forth.

In some embodiments, a principal value comprises corresponding categorical attributes and values thereof. In one example, if the principal value is "log on time", categorical attributes could include users, system ID, login locations, and so forth.

When the input stream is received, the exemplary input stream parser module 130, shown in the example in FIG. 1, may be executed to separate or parse the input stream into data instances that are ordered in time. That is, in various embodiments, the data instances are collected over a period of time and time stamped as noted above. The input stream parser module 130 can determine the influence that instances of the collected data have on the computing environment using the principal values v (or at least one principal value) and corresponding set of categorical attributes $[a_j^i]$. In various embodiments, the input stream parser module 130 considers the data as a collection $\{d_i = \mathcal{V}_i, a_i^1, a_i^2, \ldots, a_i^n)\}$, where data represented by { } includes a set. Again, using the example above, a principal value v is log on time and two categorical attributes $a_j^1 \in \{jim, jill, greg\}$, which are indicative of users and $a_j^2 \in \{home, work\}$, which are indicative of a location. Additional or fewer categorical attributes can be considered. In various embodiments, the input stream parser module 130 converts the principal value and categorical attributes into a collection of sets (8:50 am, jim, work); (7:40 am, jill, work); and (6:45 pm greg, home). Other similar tuples can be created for other types of data sets, and can include a combination of numerical and/or non-numerical values.

In some embodiments, anomaly influence aims to understand the way that the categorical attributes are influencing the anomalies that are located by analyzing the principal value $v$..

Anomaly detection as disclosed in various embodiments herein involves the comparison and evaluation of the at least one principal value changing over time. According to some embodiments, once sets are created from the data instances, the anomaly detection module 135 is executed to detect anomalies for the data: $\mathcal{D} = \{(t_i, d_i)\}$.

In various embodiments, the anomaly detection module 135 creates features in order to perform anomaly detection by bucketing (e.g., grouping) the data instances into continuous time intervals, where a kth bucket or group is defined according to the equation: $\mathcal{B}_k = \{(t_i, d_i) \in \mathcal{D} : t_i \geq kL, t_i < (k+1)L\}$ where L is a bucket length (e.g., time frame or portion of total time for which data instances were collected).

The anomaly detection module 135 then applies one or more set functions $f: \mathcal{U} \to \mathbb{R}$ where $\mathcal{U} \subset \{v_i : (t_i, (v_i, \ldots)) \in \mathcal{D}\}$ to generate a set of features. The value of a feature for the kth bucket is thus $f(\mathcal{B}_k)$. In one example, if $v_i$ are numerical, the set function is a mean that is calculated using: $f = 1/|\mathcal{U}| \Sigma_{\mathcal{U}} v_i$; ; whereas if $v_i$ are categorical, the set function selected is a count $f|\mathcal{U}|$; and alternatively if $v_i$ are categorical, the set function is a distinct count $f = |\{[v_i]\}|$, where [*] denotes its arguments equivalence class. Thus, the principal value can include any of numerical values, categorical values, combinations thereof, or other similar principal value types that would be known to one of ordinary skill in the art with the present disclosure before them. Examples of a numerical principal values as provided above would include 8:50 (am), 100 (gigabits of data), 30 (memory access operations), 80% (CPU usage), and so forth. Examples of categorical principal values include forth. Examples of categorical principal values include names, locations, or other non-numerical data.

The anomaly detection module 135, in the above example, then applies a suitable anomaly detection algorithm to the bucketed data instances.

In various embodiments, the suitable anomaly detection algorithm will take as inputs bucket features $\{f(\mathcal{B}_i)\}$ for buckets chronologically earlier in time than a current bucket j, i.e., for i<j, and then generate an anomaly score which corresponds to how anomalous is the value $f(\mathcal{B}_j)$ for the current bucket j. The operation for the exemplary algorithm can be expressed as $(f(\mathcal{B}_j), \{f(\mathcal{B}_i: i<j\}) \mapsto s$ where s is the anomaly score.

In various embodiments, an exemplary anomaly detection algorithm tries to predict a distribution for a new feature value based on relevant historical data and the time the feature value occurs. The exemplary anomaly detection algorithm can account for multiple effects, such as slowly changing level, periodic patterns, weekday/weekend differences and recurrent patterns that relate to the calendar. For example, if a prediction is being made for 10 am on Monday morning, the anomaly distribution algorithm will estimate the probability distribution of values for the feature based on historical behavior for Monday mornings around that time and may also account for differences between days of the month or Mondays of the month. In some embodiments, a test is made to check if there is a statistically significant over occurrence of large predictions errors which coincide with a particular calendar feature. For example, it is expected on average there to be "n"×"p"/100 "p" percentile prediction errors given "n" predictions. Furthermore, (assuming independence), this must follow a binomial distribution. Therefore, the exemplary algorithm can calculate the chance of seeing a given count (or higher) of large prediction errors for a particular day of month, day of week and week of month, say the 2nd Monday of each month, and so on. In various embodiments, if this chance is small then it is typically appropriate to estimate a correction to the predicted distribution which depends on this feature, i.e., correct the predictions with information about previous of the same type of calendar day.

In order to understand what the impact of one of the categorical attributes is on an anomaly, it is noted that the distinct values of the attribute create a partition of the data instances in the bucket, i.e., the data instances for which the ith categorical attribute is a) is an equivalence class defined by: $[a_j^i]_k = \{(t_i, d_i) \in \mathcal{B}_k : d_i = (\mathcal{V}_i, a_*^1, \ldots, a_j^i, \ldots, a_*^n)\}$. For example, $a_*^1$ denotes any value from the set of possible values for the first type of categorical attribute. Examples of the type of categorical attribute include user and location.

Using the aforementioned algorithms and the separation of data instances by their categorical attributes, the exemplary counterfactual processing module 140 may selectively remove portions of the data instances corresponding to each categorical attribute, recalculate the anomaly scores, and determine if removal of the categorical attributes reduces or removes the anomaly. If removal does reduce or remove the anomaly, it can be determined that the object of the computing environment responsible for producing the removed categorical attributes is likely a source (could be one of many) for the anomaly. This process, in various embodiments, does not categorize the detection of an anomaly as a malicious or nefarious event, but instead detects the anomaly and flags associated portions of the computing environment for further consideration or review.

In various embodiments, the counterfactual processing module 140 can provide a mechanism for asking and answering questions such as, for example, what would the situation be like if all the data labelled with a given attribute were removed, or what would it be like if all the data except that labelled with a given attribute were removed.

In various embodiments, these counterfactual processing can be executed very efficiently depending on the function. For example, to do this process for a mean (e.g., numerical principal value) the system 105 is not required to store all the data in a bucket, but only additionally maintain a count and mean of values for each distinct value of each categorical attribute. Specifically, for each equivalence class we need $$|[a_j^i]_k| \text{ and } 1/|[a_j^i]_k| \sum_{(t_i, d_i) \in [a_j^i]_k} v_i.$$

This counterfactual approach for understanding causation, according to various embodiments, falls under logical principles of "if B does not happen, C does not happen" and thus "B causes C" by logical extension. Specifically, for certain types of set functions (e.g., countably additive functions) it is understood that the attribute $a_j^i$ influences an anomaly for the bucket $\mathcal{B}_k$ if the output of the anomaly detection algorithm (e.g., a score of the bucket), is that the bucket is less anomalous in the alternative world in which the only thing that changed is that all the data instances labeled with $a_j^i$ are removed. Stated another way, various embodiments ask whether the anomaly scores are lower when a portion of the data instances with specific categorical attributes are removed and the remaining data instances are rescored. If yes, the specific categorical attributes whose data instances were removed likely contributed to the discrepant anomaly score.

In general, counterfactual reasoning agrees with knowledge available for countably additive functions like count or sum. For example, if it is observed first that the count is unusually high, and then observed that, if a particular category had not occurred, the count is normal. In this example, it seems reasonable to conclude that the "behavior" of that particular category caused the anomalous score.

For other types of set functions, for example, where the presence of a single example data instance can cause an anomaly of a similar score, then the system 105 may use a regularity approach for understanding causation (i.e. "B causes C" if "whenever B occurs C occurs"). More specifically, it is known that the categorical attribute $a_j^i$ influences an anomaly score of a bucket $\mathcal{B}_k$ if the output of an anomaly detection algorithm (i.e., score of the bucket) is roughly the same in all alternative worlds (such as removing any subset of the data instances which are not labeled with $a_j^i$) in which all the data instances labeled $a_j^i$ exist (e.g., whenever B occurred, C also occurred).

Examples of such set functions include determining maximum or minimum values of the principal values in the bucket, i.e., $\max\{v_i : (t_i, (v_i, \ldots)) \in \mathbb{R}\}$ and $\min\{v_i : (t_i, (v_i, \ldots)) \in \mathbb{R}\}$. For example, the system 105 may determine that a bucket minimum is unusually low and that the bucket minimum coincides with a particular categorical attribute. In that case, it seems reasonable to conclude that the "behavior" of that categorical attribute caused the anomalously low score in this example.

These exemplary processes above can be generally referred to as a process for creating and using a behavioral profile of a computing environment. In various embodiments, the behaviors of the computing environment are assessed for anomalous activity/behaviors.

Once an anomaly has been detected and a cause or causes isolated, the remediation module 145 may be executed to remediate the cause or causes in some embodiments. In various embodiments, the specific methods by which the remediation module 145 remediates a cause are highly dependent upon the type of anomaly detected. For example, if the anomaly includes a high rate of access to a particular database, the remediation module 145 may restrict access privileges for the database until the anomaly is reviewed. If the anomaly is unusually frequent file transfers (e.g., exfiltration) of high volumes of data outside a protected network, the remediation module 145 may restrict file transfers by specifically identified machines in the network. This could occur through changing firewall policies or preventing access to any external network by the machines.

In sum, the present disclosure provides various embodiments of systems and methods to detect anomalies within computing environments and deduce the cause or causes of those anomalies. The systems and methods can detect unusual events, rates, metrics and so forth for any computing environment. In some embodiments, multiple anomalies can be present and detected by the systems and methods herein. For example, the systems and methods can detect both exfiltration of data and excessive login attempts.

Figure 2:
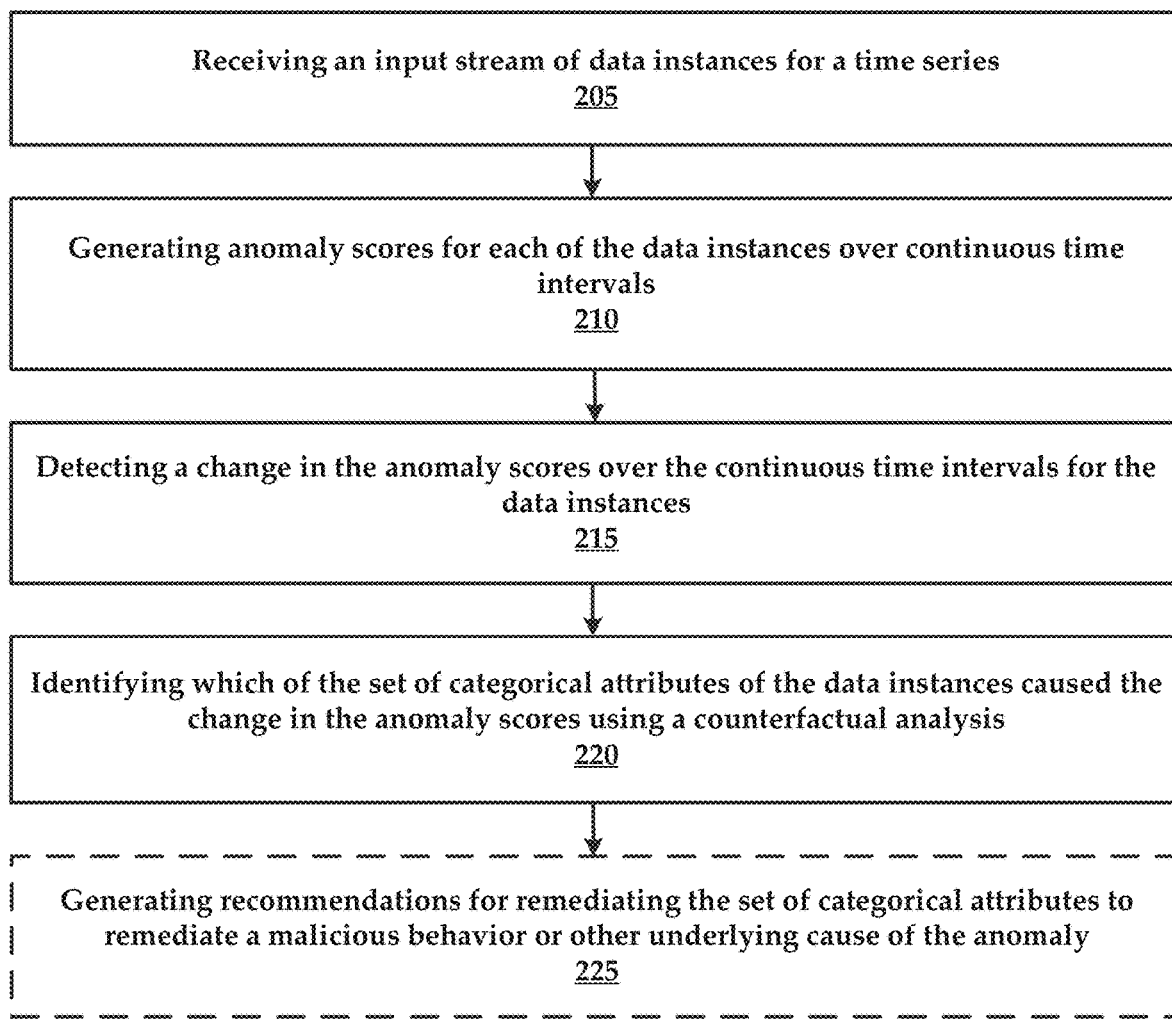
FIG. 2 is a flowchart of an example method for detecting anomalous activity in a computing environment and determining a cause(s) thereof.

FIG. 2 is a flowchart of an example method 200 of detecting anomalous activity in a computing environment and determining one or more causes for the anomalous activity. The example method 200 comprises a step 205 of receiving an input stream of data instances for a time series. For example, an input stream can be received from a computing environment. The time series can include any span of time desired. The method includes evaluating the input stream that includes data that spans over a period of time. The example method 200 can involve using unsupervised machine learning, inasmuch as the data utilized is that which is included in the input stream only. That is, the entirety of the analysis, in some embodiments, involves the input stream without using pre-determined or pre-configured metrics for assessing the data instances of the input stream.

In some embodiments, the data instances of the input stream are time stamped. The data instances also comprise at least one principal value, and each principle principal value comprises a set of categorical attributes After the input stream is received, the example method 200 includes a step 210 of generating anomaly scores for each of the data instances over continuous time intervals. That is, the data instances may be scored in a chronological manner such that anomaly scores along the timeline are calculated. The example method 200 then includes a step 215 of detecting a change in the anomaly scores over the continuous time intervals for the data instances. Stated otherwise, the example method 200 examines the scores calculated for the buckets of data instances (as described above) and locates variances in the scores that are indicative of an anomaly. In some embodiments, the user can specify how much scores can deviate over time before the deviations are flagged as an anomaly. For example, if the principal value is network traffic volume, and the network traffic volume rates change only slightly (e.g., +/−5%), these discrepancies in network traffic volume are not anomalous, whereas a change of more than 10% may be flagged as anomalous.

In various embodiments, an anomaly score is a normalized measure of how big the deviation is, and the larger the score the more unusual the deviation. In some embodiments, the system 105 characterizes historical deviations using a density function, i.e., a chance f(x) of seeing a deviation x in the value of the set function. The anomaly score, in some embodiments, is related to the chance of seeing a deviation which is at least as unlikely, i.e. the total chance of seeing any value y for which f(y)<f(x). A fixed cutoff on the anomaly score can be utilized, i.e., an anomaly is something which should occur rarely based on historical data, so has a score greater than a fixed threshold. The score may therefore amount to a dynamic threshold since it is based on the data characteristics. In various embodiments, the system 105 separately and precisely controls the rate at which the system 105 generate alerts at a specific severity based on the anomaly score, i.e., the system 105 does not allow this to exceed (over a very long time frame, although it can exceed it for shorter time frames) more than a certain value. Higher severity alerts are allowed less frequently, according to some embodiments.

Figure 3:
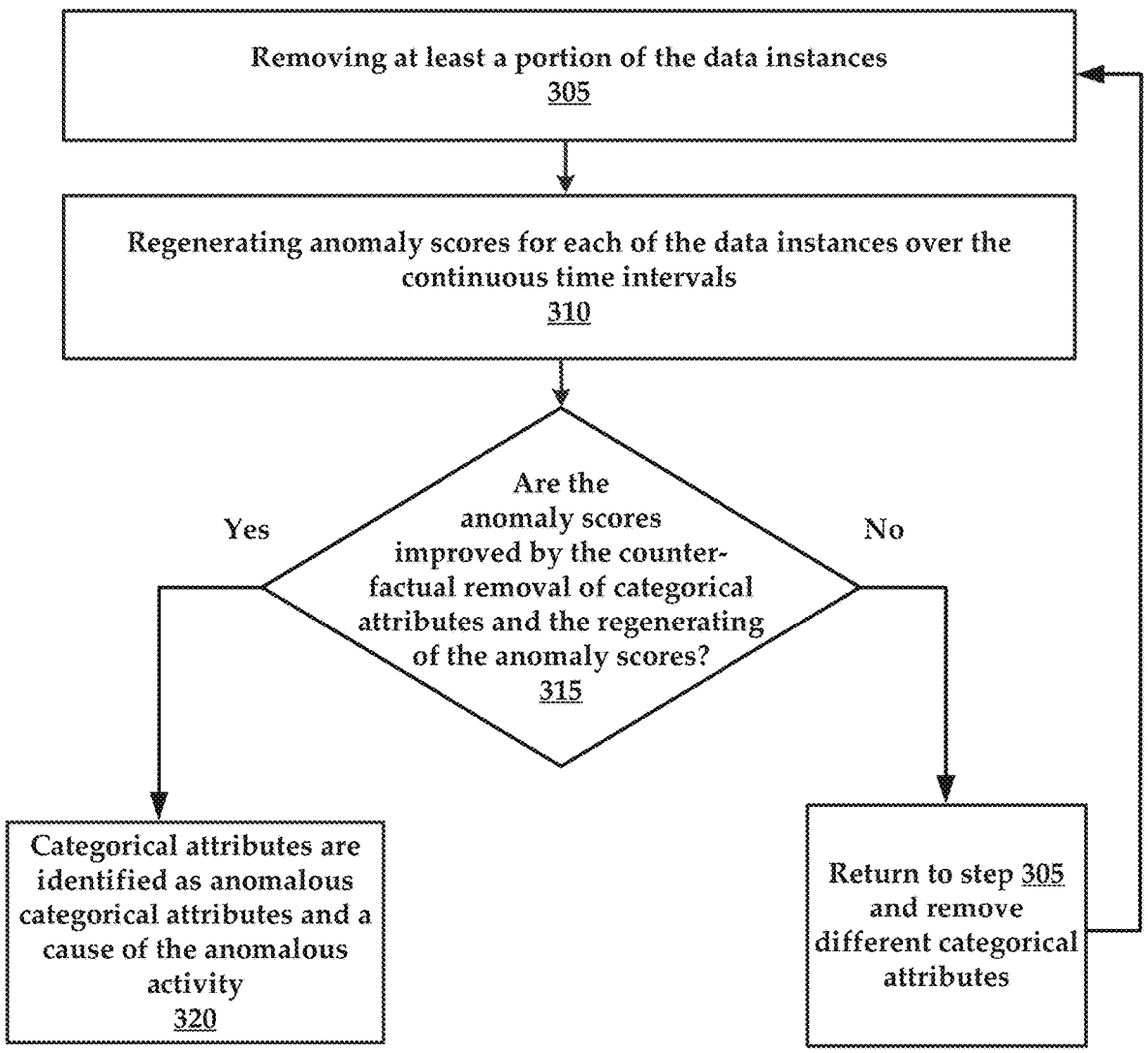
FIG. 3 is a flowchart of an example method of counterfactual analysis for determining a cause or causes of an anomalous activity.

The example method 200 includes a step 220 of identifying which of the set of categorical attributes of the data instances caused the change in the anomaly scores using a counterfactual analysis. FIG. 3 illustrates an example method 300 of counterfactual analysis.

In some embodiments, the example method 200 can include an optional step 225 of generating recommendations for remediating the set of categorical attributes to remediate a malicious behavior or other underlying cause of the anomaly. For example, the system can suggest that users not be allowed to log in from remote locations if categorical attributes indicate that users are logging in after permissible log in hours when remote. In another example, the system can suggest that all devices that are used to access a particular database use a higher level of authentication in response to detecting anomalous activity (e.g., high level of access requests) with respect to the database.

FIG. 3 is a flowchart of an example method 300 of counterfactual analysis, which is an example embodiment of the identifying step 220 in FIG. 2. The example method 300 comprises a step 305 of removing at least a portion of the data instances. For example, data instances associated with a device on a network can be removed. Next, the example method 300 includes a step 310 of regenerating anomaly scores for each of the data instances over the continuous time intervals. Next, a determination is made in step 315 if the regenerated anomaly scores are improved (e.g., by the removal that used "counterfactual" processing) compared to the anomaly scores. If the anomaly scores are improved (e.g., variances in anomaly scores are removed and the anomaly scores are substantially consistent with one another), then at least a portion of the categorical attributes are identified as anomalous categorical attributes and a cause of the anomalous activity in step 320 of the example in FIG. 3. Stated otherwise, an improvement in an anomaly store is a lower score (e.g., the deviation is less unusual), according to various embodiments.

If the anomaly scores are not improved, the example method 300 returns to step 305 and a second portion of the categorical attributes are removed and steps 310 and 315 are repeated. This process may continue until a cause or causes of an anomaly are determined. In various embodiments, the system 105 allows for multiple causes of an anomaly, i.e. it is possible that two distinct categorical attributes both contribute to the anomaly, and the system 105 will report each cause. The system 105 can order the attributes in such a way that testing can terminate when the system 105 locates an attribute which doesn't "cause" an anomaly. The system 105 can compute a positive score for how influential a categorical attribute is, with zero meaning not influential at all.

The counterfactual processing, in various embodiments, e.g., as used in step 220 and method 300, comprises efficiently subtracting components from a behavioral profile (e.g., analysis of the input stream) until the component contributing to the unusual behavior is isolated and located.

In some embodiments, the systems and methods can utilize a regularity analysis rather than a counterfactual analysis. In various embodiments, the regularity analysis comprises identifying when a specific categorical attribute of the set of categorical attributes influences the anomaly score for the data instances if an output of an anomaly detection algorithm is approximately identical for alternative cases in which all the data instances with that specific categorical attribute exist.

Figure 4:
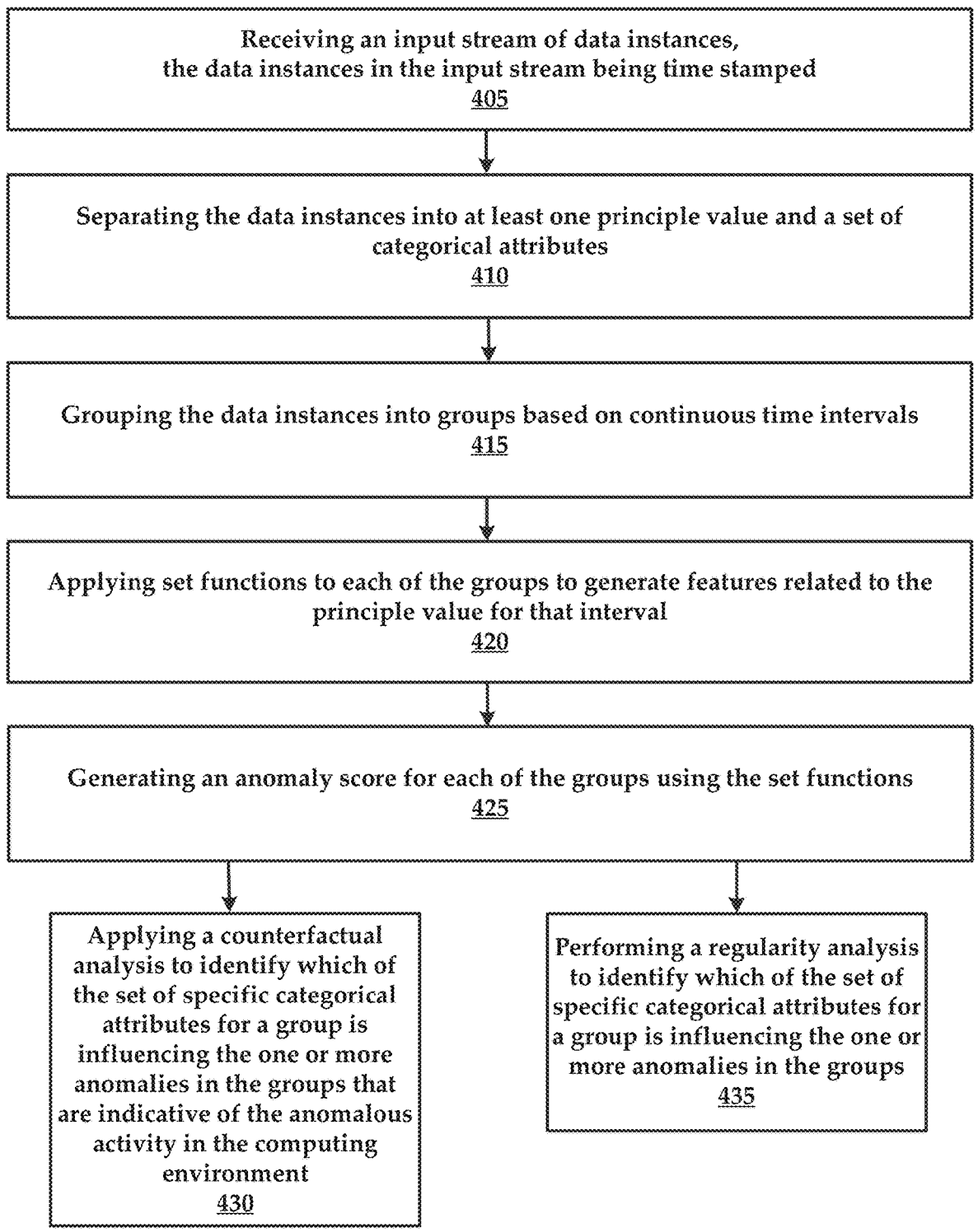
FIG. 4 is a flowchart of another example method of anomaly and causation detection.

FIG. 4 is a flowchart of another example method, example method 400, of anomaly and causation detection according to various embodiments. The example method 400 includes a step 405 of receiving an input stream of data instances. In various embodiments, the data instances in the input stream are time stamped. The example method 400 includes a step 410 of separating the data instances into at least one principal value and a set of categorical attributes, as well as a step 415 of grouping the data instances into groups based on continuous time intervals. It will be understood that, in various embodiments, each of the continuous time intervals has a length that represents a duration of the interval.

Next, the example method 400 includes a step 420 of applying set functions to each of the groups to generate features related to the principal value for that interval, and a step 425 of generating an anomaly score for each of the groups using an anomaly detection algorithm.

In some embodiments, the example method 400 comprises either (or both) a step 430 of applying a counterfactual analysis to identify which of the set of specific categorical attributes for a group is influencing the one or more anomalies in the groups that are indicative of the anomalous activity in the computing environment; or a step 435 of performing a regularity analysis to identify which of the set of specific categorical attributes for a group is influencing the one or more anomalies in the groups.

According to some embodiments, the present disclosure provides enhancements in processing input streams and/or multi-dimensional attribute sets. In some embodiments, these input streams comprise data instances.

These data instances can comprise time series based data instances, or in some embodiments non-time series data instances. In embodiments where time series based data instances are provided, the time data (such as a timestamp) associated with the data instances can be ignored if desired. In some instances the time data can be converted into a feature and included as a yet another dimension of the data instances.

The data instances can each include a plurality of distinct attributes that are indicative of an entity or object. For example, in a computing environment, such as a cloud, tenants of the cloud may use various resources such as virtual machines, computing resources such as CPU, memory, applications, and so forth.

Each of these tenants will likely possess or be associated with numerous attributes that represent information about the tenant in terms of who they are, how they behave within the cloud, and so forth. The aggregation of these attributes is referred to as a data instance. In some embodiments, data instances are comprised of a value and a parameter. For example, a data instance related to Memory usage could include {2.0, Gigs}, where 2.0 is the value and Gigs is the parameter.

It is valuable for the cloud administrator or the tenants to understand commonalities between these tenants that might guide decisions such as resource deployment, security, and other cloud-based considerations.

A high-order analysis might include, for example, an analysis of all resources used by a plurality of tenants in the cloud. Finding commonalities between these tenants across a large number of attributes is desired. For example, the system administrator may desire to understand which entities are high bandwidth users, high memory users, or other similar types. These are generally referred to herein as a clustering type. The clustering type defines the desired features that are considered when evaluating data instance in a high-order analysis.

Unfortunately, when assessing entities/objects with a high number of features, it can become difficult, if not impossible to understand the commonalities between the objects. Thus, making intelligent determinations with respect to these entities becomes difficult if not impossible. Thus, clustering these objects in a meaningful manner is difficult, especially in high-order feature analyses. Also, the presence of outliers in the data instances can result in skewed analyses.

Thus, a need exists for systems and methods that can provide for clustering and outlier extraction in high-order feature analyses. These systems and methods can be used to support anomaly detection in computing environments. For example, it is advantageous to perform clustering in combination with anomaly detection to ensure that actions taken in response to the anomaly detection occur with respect to the correct clusters of entities and/or objects.

It will be appreciated that while the above example references a cloud and tenant arrangement, the systems and methods of clustering and/or outlier detection are not so limited to these use cases. The systems and methods of clustering and/or outlier detection are equally applicable to any anomaly detection process, as well as other uses cases where clustering and outlier detection provide advantages, such as in e-commerce and/or targeted advertising applications.

In general, clustering and outlier detection allow for removing data instances that are considered to be of negative value to an underlying analysis. For example, a cloud administrator might desire to remove a portion of the data instances related to tenants that do not frequently utilize cloud services. These tenants, regardless of their actual cloud resource usage are presumed to be negative values with respect to the particular analysis being performed by the cloud administrator. For example, the cloud administrator might be interested in analyzing behaviors or attribute sets from only tenants that consistently use cloud services to ensure that SLA (service level agreements) are maintained with respect to these tenants.

In some embodiments, the systems and methods disclosed herein create feature vectors from the data instances and attributes identified therein. Again, a feature is parameter and/or value pair.

Thus, these inconsistent usage tenants are removed from consideration when creating feature vectors from data instances of tenants.

According to some embodiments, clustered data instances are displayed on interactive graphical user interfaces in the form of scatter plots, and the like. These GUIs allow users to select and view feature vectors created from data instances. In some embodiments, the feature vectors are plotted using a plurality of graphs or plots, where each graph/plot is created for a unique clustering type. For example, one graph may cluster based primarily on CPU usage and memory consumption, whereas another graph may cluster based on network bandwidth usage and usage time.

In some embodiments, outlier thresholds are established in order to effectuate filtering and exclusion of outlier data instances. In one or more embodiments, feature vectors are displayed to a user through an interactive graphical user interface. When outlier thresholds are adjusted, changes to the graphs/plots are visible in real-time.

Some embodiments provide interactive GUIs that allow a user to interactively explore characteristics of scatter plotted data. For example, selecting a dot or scatter plot point of a scatter plot can result in display of the data instance that underlies the scatter plot point. In one or more embodiments, the selection of a scatter plot point in one graph will result in the highlighting of the same scatter plot point on other graphs on the GUI. FIG. 1 is a flowchart of an example method of the present disclosure. The method generally comprises a step 502 of receiving an input stream comprising data instances.

In some embodiments, the data instances are not received as an input stream but could be obtained from a database or from a structured or unstructured file. Regardless of the method by which data instances are obtained, each of the data instances comprises a multi-dimensional attribute set. In the examples provided above, a multi-dimensional attribute set of a tenant in a cloud environment could include, for example, CPU usage, memory usage, VM usage, application usage, and so forth. Each of these attributes can in turn include individual parameters or attributes. In sum, the multi-dimensional attribute sets can include pairs of categorical parameters and values.

Next, the method comprises a step 504 of identifying any of outliers and singularities in the data instances. These outliers and singularities were described above as negative values or data which might obscure the data that is desired to be displayed by a user. For example, these would include feature vectors (created from data instances) that would match the clustering type used to generate a scatter plot, but the presence of these feature vectors displayed on the scatter plot is not desired. In one example, the outliers and singularities might include data instances that have features that are categorically excluded from consideration. Using the examples provided above, tenants in a cloud may be excluded from the analysis if the tenant infrequently uses the cloud services, notwithstanding the fact that the tenant uses CPU and memory resources that fall within the specified ranges for these values. This could occur if the cloud administrator is interested in viewing the behaviors of only tenants that frequently use these CPU and memory resources on a daily basis. Thus, these infrequent users are excluded from consideration. Again, the ability to define how outliers are determined and excluded will be described in greater detail infra.

Figure 5:
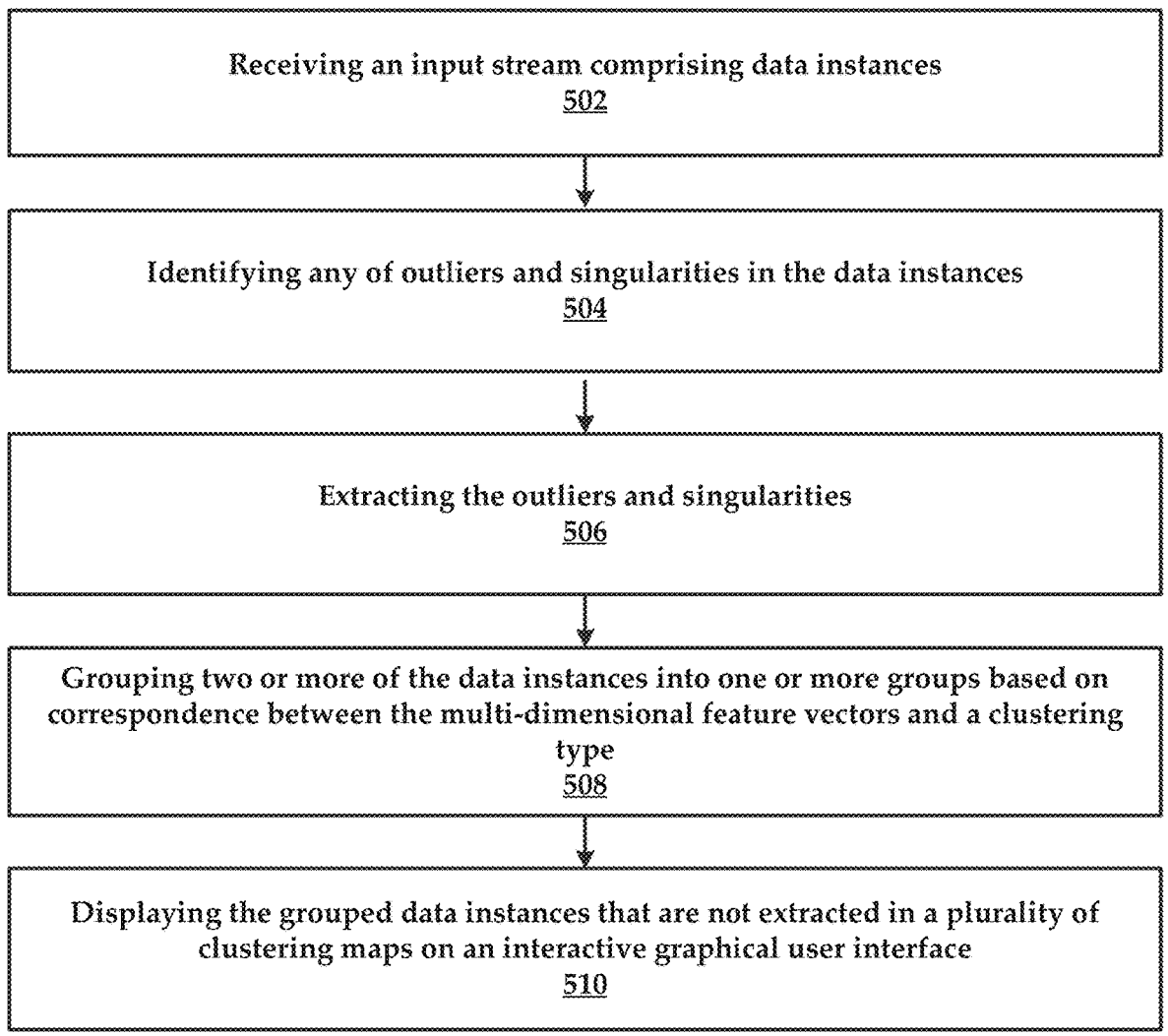
FIG. 5 is a flowchart of an example method for data instance clustering and outlier detection to support anomaly detection in a computing environment.

Returning back to the method of FIG. 5, once outliers and/or singularities have been identified, the method includes a step 506 of extracting outliers and singularities. To be sure, an example method for detecting or identifying outliers and singularities can be found in FIG. 6, which is described in greater detail below.

Next, the method can also include a step 508 of grouping two or more of the data instances into one or more groups based on correspondence between the multi-dimensional feature vectors and a clustering type. For example, each feature vector component can be compared and used to group. In one instance, users who have CPU usage in a specified range, and memory usage in a specified range, as well as application access within a specified range may be grouped or clustered together. Further, queries can be executed against these grouped or clustered tenants by applying a clustering type. By way of non-limiting example, if the clustering type is "tenants using a specified amount of CPU capacity", clustered tenants can be identified based on their shared feature vectors that fall within this clustering type. Additional aspects of clustering type are disclosed in greater detail below with reference to the generation of scatter plots and GUIs comprising the same.

Generally speaking, the clustering or grouping process disclosed in step 508 involves removing outliers prior to clustering or grouping. Clustering is then applied to the resulting data.

Next, the method can comprise a step 510 of displaying the grouped data instances that are not extracted in a plurality of clustering maps on an interactive graphical user interface. In some embodiments, each of the plurality of clustering maps is based on a unique clustering type as described above.

In some embodiments, the method can terminate at step 510, or can continue on to another method, such as an e-commerce related method or an anomaly detection method.

In general, the method of FIG. 5 will process multi-dimensional feature vectors, performing outlier/singularity detection steps, and then grouping of the processed feature vectors based on commonalities between data instances (e.g., multi-dimensional feature vectors). The commonalities can be based on similarities in feature values. For example, data instances of multiple tenants that have approximately similar CPU, memory, bandwidth, and other related resource values may be grouped together. In some instances, the features used to group the data instances are user selected. For example, the user may only want to group together data instances that have similar CPU and memory resource usage values. These selected or commonly shared features are referred to as clustering type(s).

In some embodiments, the outlier/singularities are removed from review. In other instances, outlier/singularities are ignored from consideration when grouping data instances (e.g., multi-dimensional attribute sets).

While this method can be used to support anomaly detection, it will be understood that the methods of extracting outliers and singularities in data instances are to be understood as being separate from methods of anomaly detection in some instances. That is, the methods of determining and extracting outliers and singularities in data instances are fully capable of being used in conjunction with methods of anomaly detection, but are also fully capable of being used without consideration of anomaly detection, such as in e-commerce embodiments described herein. Thus, the various embodiments disclosed herein can be used independently of anomaly detection. For example, the outlier detection methods herein can be applied to many use cases outside of digital security and machine data. For example, methods of extracting outliers and singularities can be used for an e-commerce website where a user may want to segment customers (via clustering) according to behavior for marketing purposes, or the user may desire to identify fraudulent financial transactions in bank records, and so forth.

Figure 6:
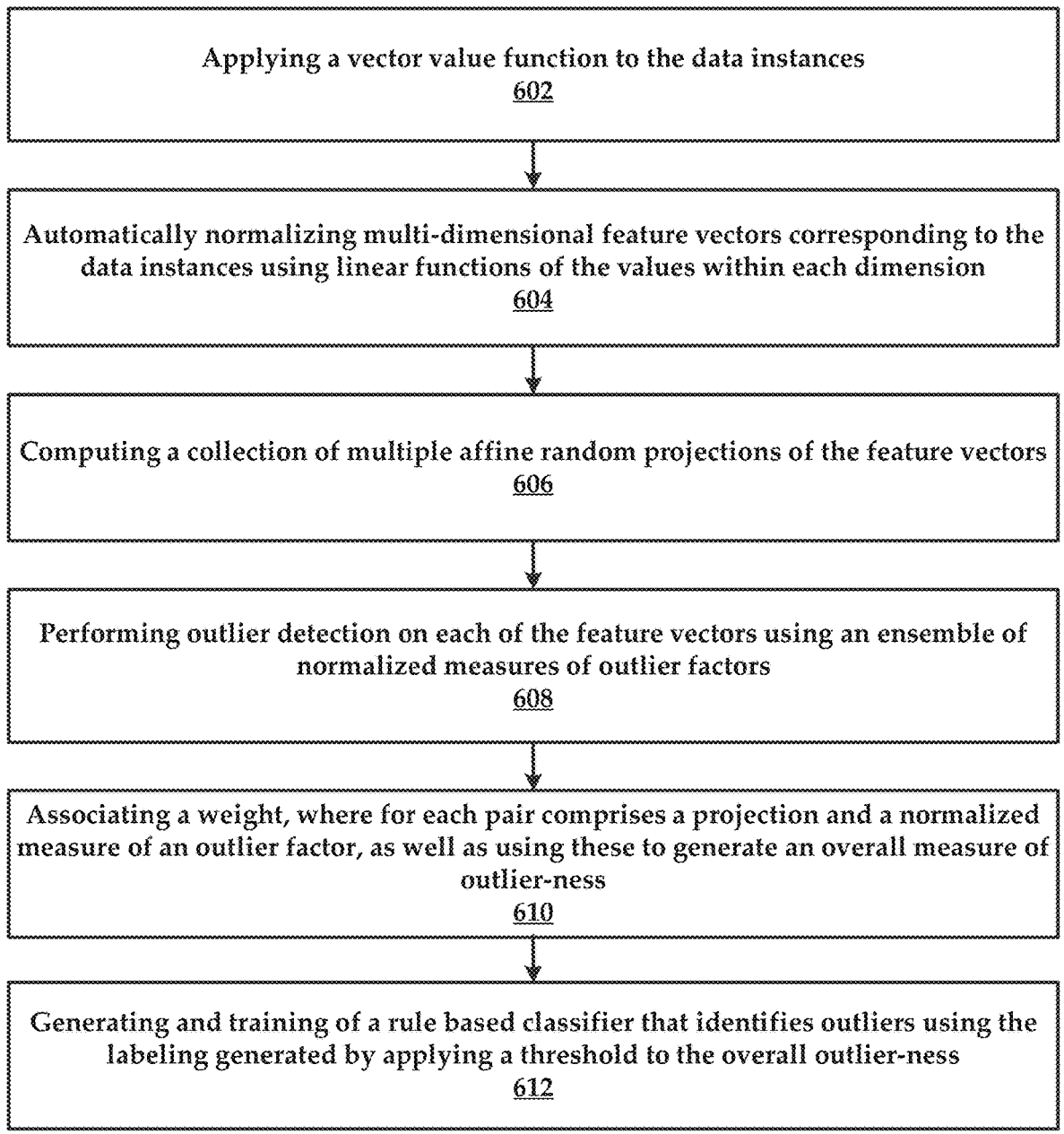
FIG. 6 is a flowchart of an example method of outlier and singularity identification.

FIG. 6, referred to briefly, is a flowchart of an example process of point outlier detection with respect to multi-dimensional attribute sets. In general, the process includes extracting outliers in data instances using distance based methods. The data labeling, i.e. as outlier (or inlier being not an outlier) thus generated, is then automatically mapped onto a set of rules which can be use to identify outliers (or inliers).

In some embodiments identifying outliers and singularities in the data instances further comprises an initial step 602 of applying a vector value function. According to some embodiments, raw data of the data instances is converted into feature vectors via a variety of transformations. For example, for a user of an e-commerce website, features may be total number of items purchased, and the number of distinct items purchased. These features are created by aggregating the raw data. In some embodiments, the feature may be the raw data value, but the systems and methods can also aggregate the data to create features. This can be done through machine learning in some instances.

In some embodiments, the method is configured to operate on any vector description of each member of the set by applying a vector value function $f: S \to \mathcal{V}$ for $\mathcal{V} \in \mathbb{R}^n$. In some embodiments, the vector value function is applied to the multi-dimensional attribute sets included in the data instances.

In more detail, the method further includes a step 604 of automatically normalizing multi-dimensional feature vectors corresponding to the data instances using linear functions of the values within each dimension.

In some embodiments, the method includes a step 606 of computing a collection of multiple affine random projections of the feature vectors as well as a step 608 of performing outlier detection on each of the projected feature vectors. In some embodiments, the step includes using an ensemble of normalized measures of outlier factors that include, but are not limited to, local outlier factor, distance to kth nearest neighbor, distance to sum distance to k nearest neighbors, and so forth.

In one or more embodiments, the method includes a step 610 of associating a weight, where each pair comprises a projection and a normalized measure of an outlier factor and using these to generate an overall measure of outlier-ness.

With respect to weighting, in some instance, for each (projection, normalized measure) pair associate a weight, unit initialized, which can be adjusted via gradient descent based on user feedback to maximize some measure of accuracy of the ensemble.

Steps 602-610 culminate in a step 612 of generating and training of a rule based classifier that identifies outliers using the labeling generated by applying a threshold to the overall outlier-ness. After the creation of the rule based classifier, the method includes a step of applying the rule based classifier to the data instances to automatically determine outliers in the data instances.

In general, this method creates representations that provide intuition into the nature of the outliers present in the data instances which can be hard to understand particularly in high dimensional data. The GUIs are provided to enable real time outlier detection. The thresholds used in the rules can also be edited by the end user.

In one or more embodiments, feature scores calculated for grouped data instances can be compared against thresholds to identify anomalous behavior in order to perform methods of anomaly detection. For example, a threshold can include an upper bounding threshold where feature values at or above the threshold are indicative of anomalous behavior, or a lower bounding threshold where feature values at or below the threshold are indicative of anomalousness.

By way of non-limiting example, the multi-dimensional attribute sets include cloud tenant information regarding computing resource usage. Example features such as CPU usage, memory usage, and bandwidth usage can be compared to individual feature/anomaly thresholds. In one instance, the memory usage feature is measured against a memory anomaly threshold of ten gigabytes. Thus, in this example VMs or tenants using more than ten gigabytes of memory resources are considered to be anomalous. Thus, the anomaly may not be indicative of malicious behavior per se, but may indicate a deviation from an expected threshold that is indicative of excess usage or other problems. Also, it will be reiterated that the anomaly detection is performed subsequent to outlier/singularity detection and grouping steps described herein. Thus, it will be understood that in some embodiments, a feature score is calculated for one or more of the features in a multi-dimensional feature set. These feature scores are compared against the anomaly thresholds in order to identify anomalies.

In some embodiments, the anomaly detection and threshold comparison may apply to multi-dimensional attribute sets that are included in time-series data instances.

It will be appreciated that any of the anomaly detection methods and systems can be used to perform anomaly detection of the grouped or clustered data instances.

In keeping with the embodiments disclosed, the data instances relate to attributes or parameters of a computing environment. Thus, the anomalous activity is occurring with respect to a computing environment.

According to some embodiments, once data instances have been grouped/clustered and outliers removed, the method can also include an ability for the system to target a message to the grouped data instances that remain. For example, tenants in a cloud that share common features of high cloud resource usage may be clustered together and targeted with a warning message that their resource consumption is exceeding allowed usage thresholds. In this example, outliers or singularities might include tenants with high cloud resource usage, but they are excluded because they possess feature that indicates that they are allowed unlimited resource usage.

As noted above, the method can include generating an interactive graphical user interface that comprises a plurality of scatter plots. In some embodiments, each of the scatter plots includes dots that correspond to the grouped data instances. In one or more embodiments, the method includes highlighting a selected one of the grouped data instances in each of the plurality of scatter plots when a dot of the one of the grouped data instances of one of the scatter plots is selected. Examples of interactive GUIs are illustrated with respect to an additional use case of the present disclosure provided below.

The following example use case is descriptive of an application of the clustering and outlier exclusion methods described above when applied to an e-commerce application. As a baseline, it will be understood that the data instances involve 540,000 purchases, 4,403 customers, 3,935 products, and 38 countries.

Figure 7:
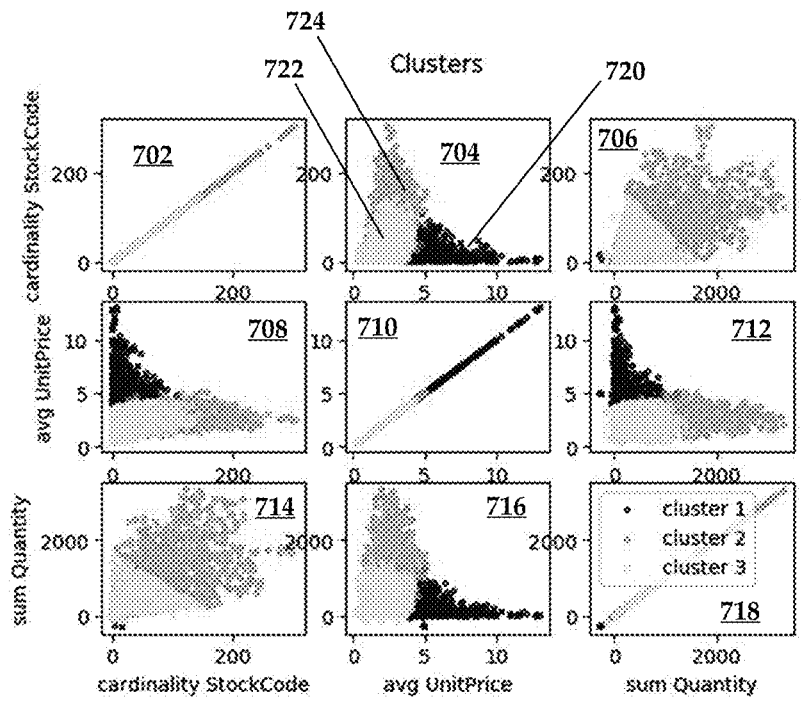
FIGS. 7-11 collectively illustrate various scatter plots of clustered data instances analyzed across a plurality of features.

In this example, data instances are indicative of customers purchasing products from one or more retailers. It is understood that a user would like to cluster customers by purchasing activities. In this analysis, three specific features are considered (although many more can be utilized). First, a cardinality of a product catalogue that is being purchased (i.e. how diverse are their shopping habits). Second, numbers of items that the customers are purchasing are considered. Third, an average unit price of the items that the customers are purchasing is considered. These three features are considered in combination and can be used to cluster customers. A resulting set of scatter plots are illustrated in FIG. 7. FIG. 7 comprises a plurality of scatter plots 702-718. These scatter plots cluster customers based on correlations of features such as cardinality of stockcode, average unit price, and sum quantity. One of features is used to plot dots in a Y-direction and another feature is used to plot dots in an X-direction. For example, in scatter plot 704 the features of cardinality of stockcode and average unit price are utilized.

A first cluster includes dots that are provided with a first hue, such as blue and are clustered in area 720. A second cluster includes dots that are provided with a second hue, such as green and are clustered in area 722. A third cluster includes dots that are provided with a third hue, such as yellow and are clustered in area 724.

Figure 8:
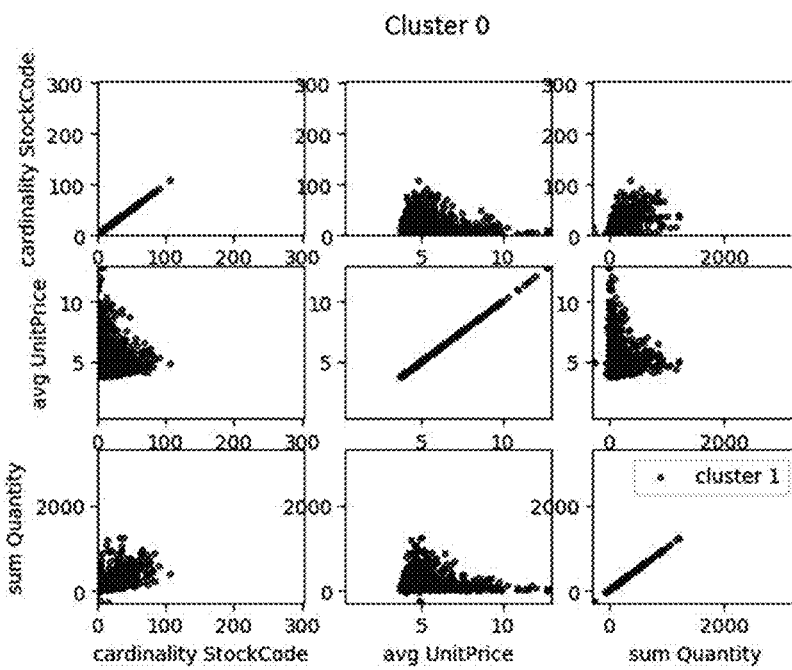
Figure 9:
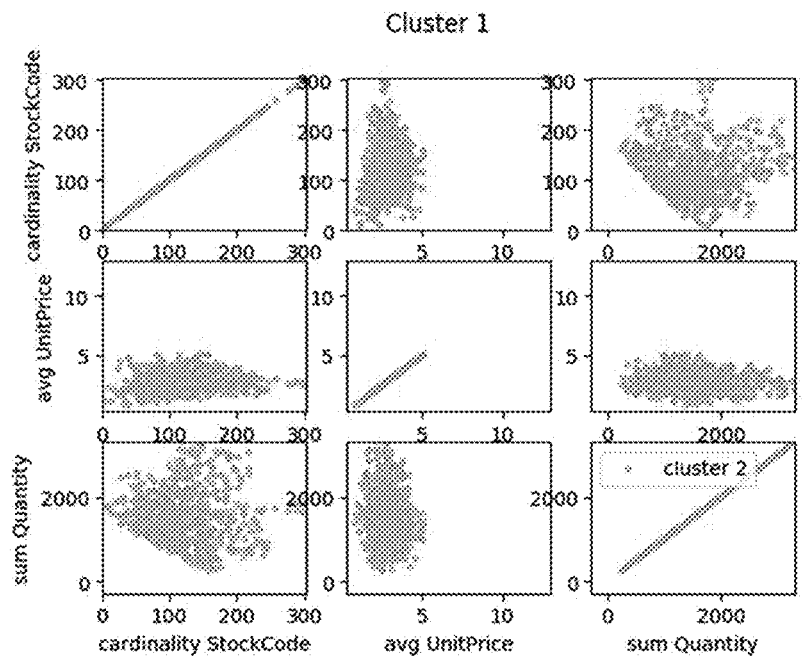
Figure 10:
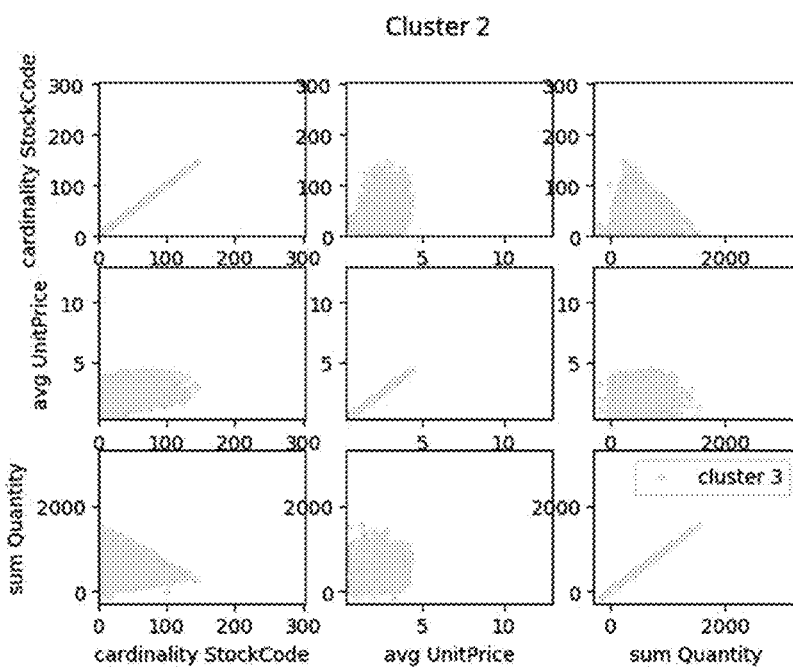

FIGS. 8-10 each illustrate the clustered groups individually. For example, in FIG. 8, dots of cluster one are displayed. Notably, in FIG. 8, the dots of cluster one are visible, whereas in scatter plot of FIG. 7, they are mostly obscured behind the dots of cluster three. In FIG. 9, dots of cluster two are displayed, and in FIG. 10 dots of cluster three are displayed.

Thus, illustrating individual clusters allows for viewing of otherwise obscured clusters when multiple clusters are scatter plotted in combination.

Figure 11:
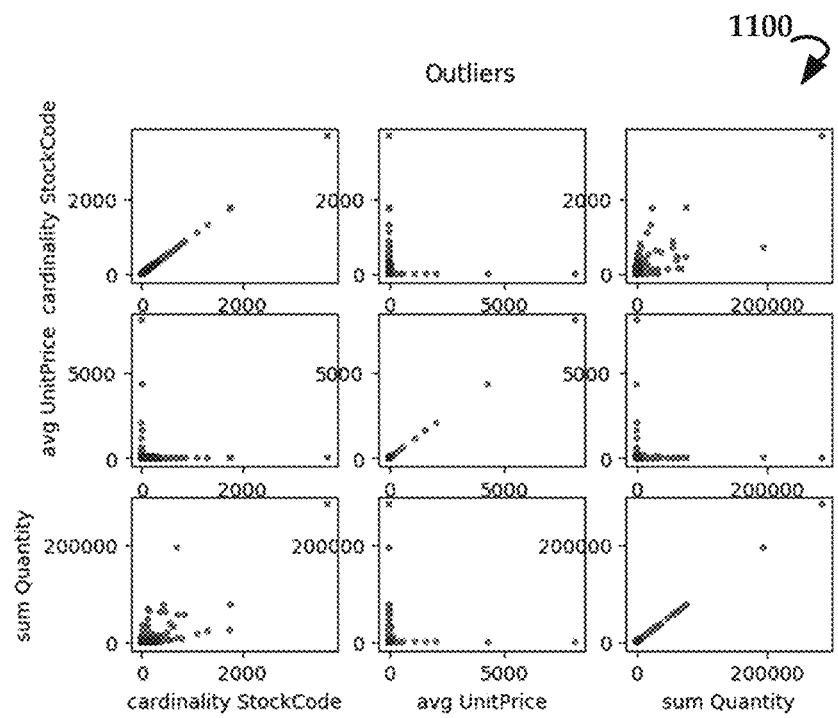
Figure 12:
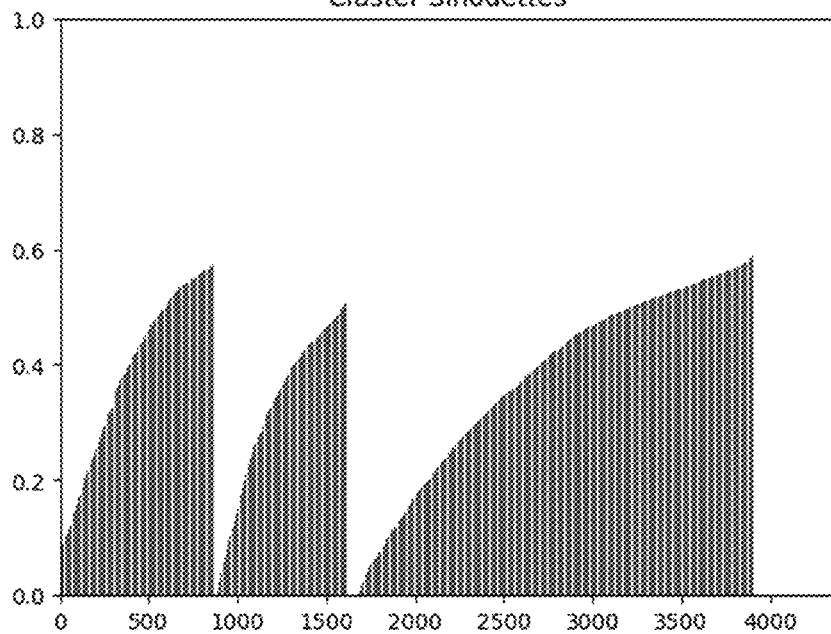
FIG. 12 is a silhouette graph of the clustered data instances of FIGS. 7-11.
Figure 13:
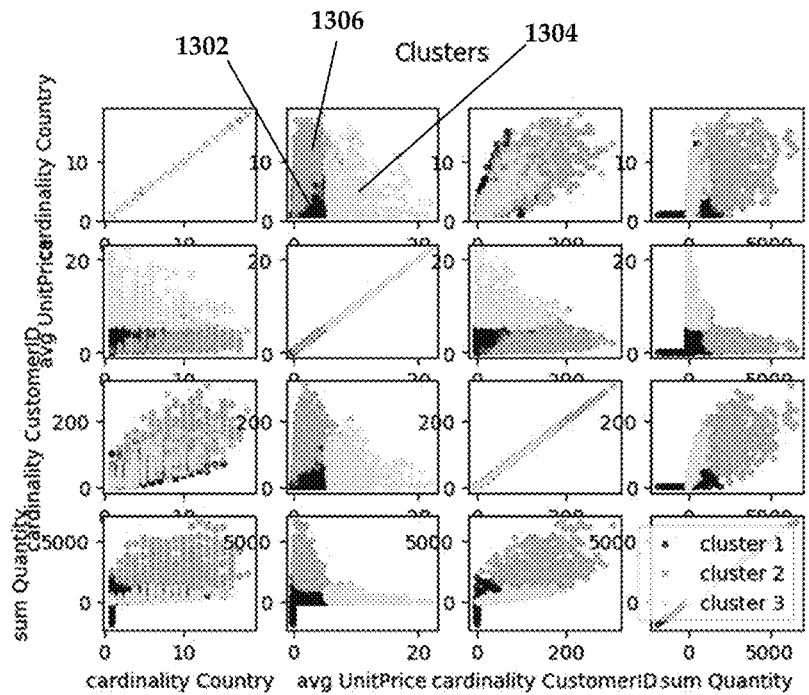
FIGS. 13-17 collectively illustrate various additional scatter plots of clustered data instances analyzed across a plurality of features in a product-based analysis.
Figure 14:
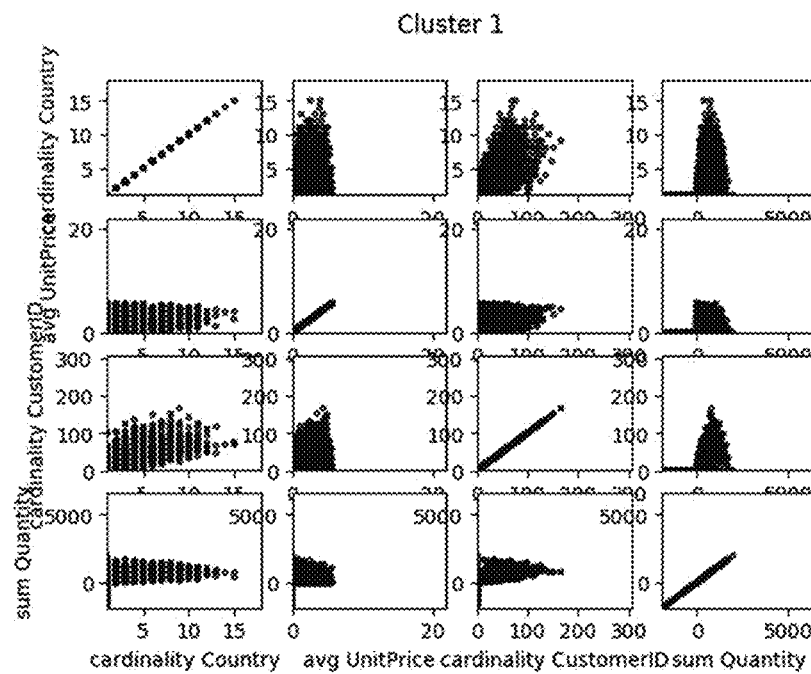
Figure 15:
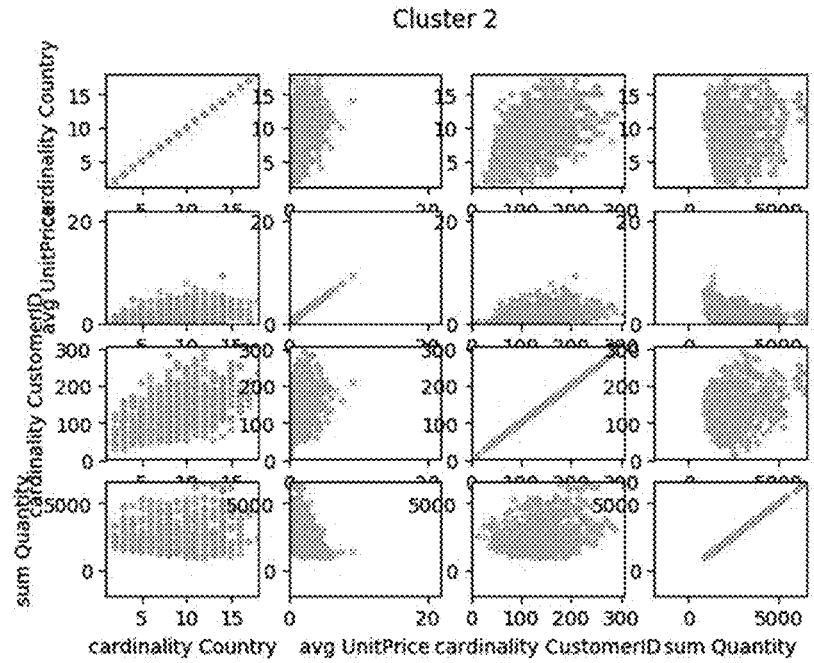
Figure 16:
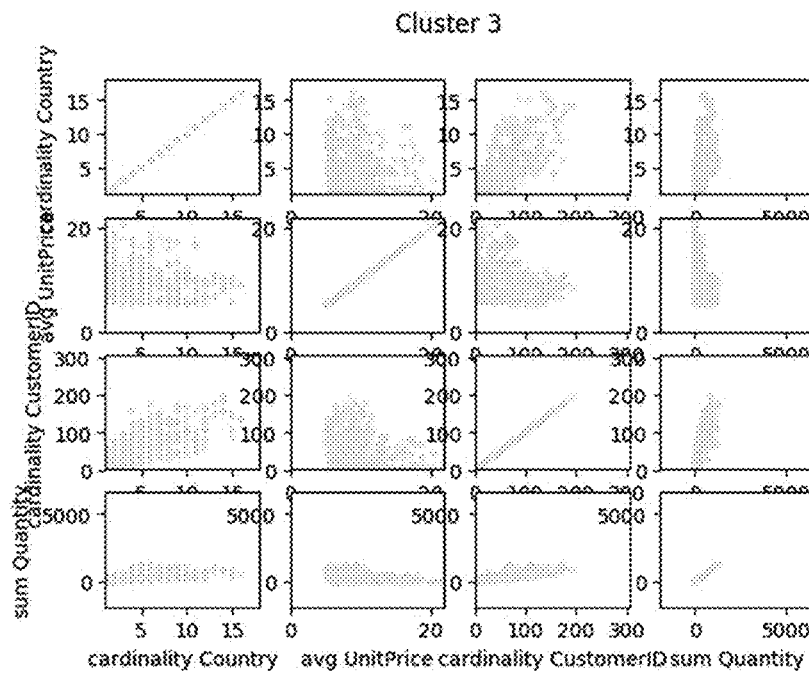
Figure 17:
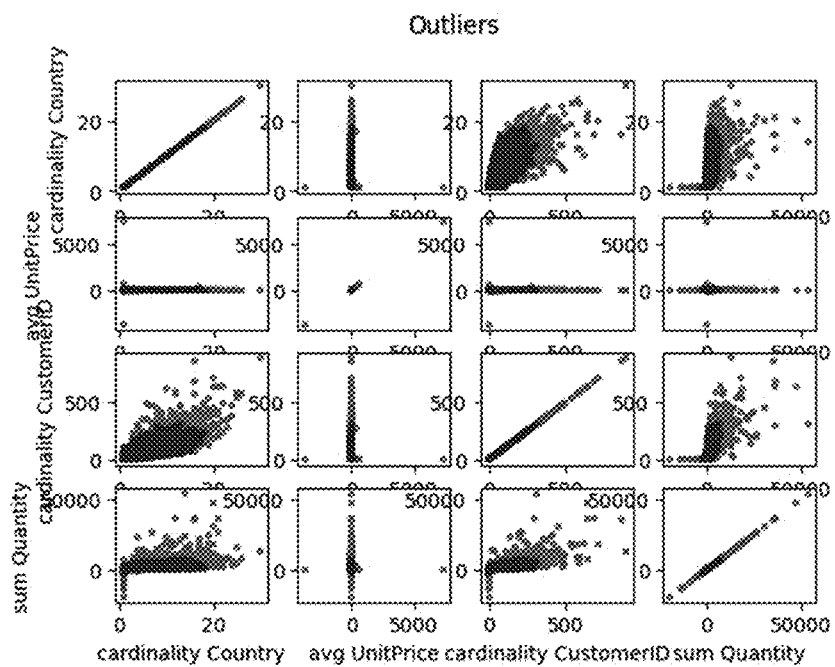

FIG. 11 illustrates a GU 1100 with a plurality of scatter plots comprising dots that are indicative of data instances that were determined to be outliers using the methods described above. FIG. 12 illustrates a graph 1200 that comprises cluster silhouettes.

The clustering described above can be utilized to identify semantically meaningful groups of customers. (NB: these are somewhat self-consistent, i.e. the silhouettes suggest that the groups are coherent.) To be specific, clustering includes normal or average customers identified above as yellow dots of a third cluster. Big spender customers are identified above as green dots of a second cluster. Loyal customers are identified above as blue dots of a first cluster. Retail customers are identified as the outliers plotted in FIG. 11.

Using these scatter plots, various information can be gathered. For example, the biggest or "normal" cluster, which comprises a little over 50% of the approximately 4000 customers, buy relatively infrequently, don't spend much when they do and haven't bought a significant range of products. The big spender cluster has similar characteristics to the normal group albeit they tend to buy slightly less diverse range of products and have bought slightly fewer products in total. The salient feature of this group however is that includes all the customers who buy the most expensive products on the website.

The loyal customers are the orthogonal extension of the normal customers as compared to the big spender. These customers don't buy expensive products but they buy significantly more products than is typical and they buy a significantly more diverse set of products.

The outliers are interesting because they separate along similar lines, i.e. either very big spenders buying products whose reported price is in the hundreds or even thousands of pounds, or buying a large number and high diversity of (on average) cheap products.

These are example conclusions that can be drawn from a review of the scatter plots above.

Additional questions can be answered using the scatter plots such as "What clusters emerge when partitioning customer activity by month?"; "What clusters emerge when partitioning customer activity by product cluster?"; "Can we deduce anything by partitioning by product or are the data too sparse?"; "Is there evidence of churn amongst loyal customers?"; "Is there correlation between customer cluster and country?"; and "How are the different customer groups purchasing volume changing in time?"

The following paragraphs and FIGS. 13-22 collectively describe a product level analysis, where products are clustered by popularity. Four features utilized include (1) number of items products sold; (2) cost of each item; (3) cardinality of the customer set purchasing them (i.e. their range of appeal); and (4) cardinality of the country set purchasing them (i.e. what is the international range of appeal).

Figure 18:
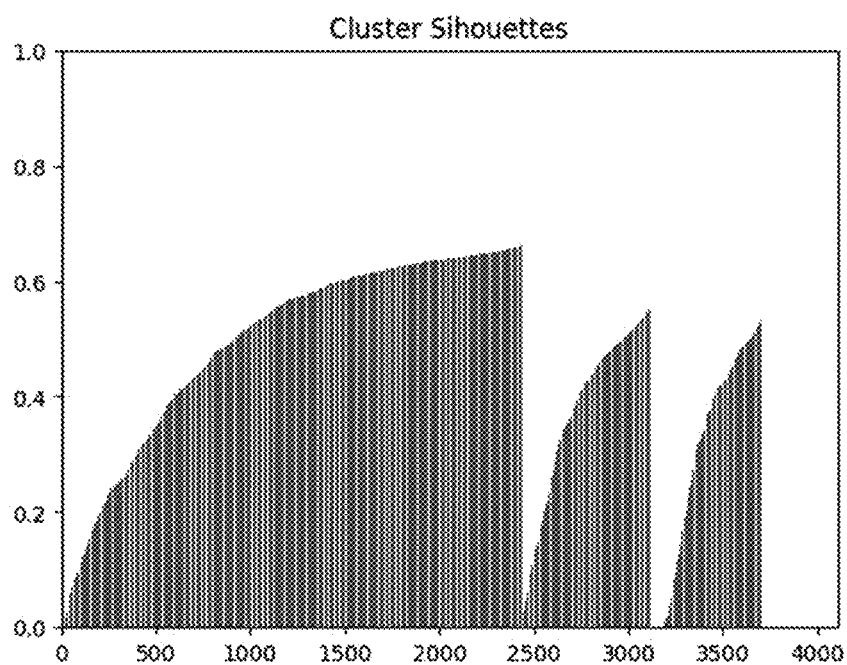
FIG. 18 is a silhouette graph of the clustered data instances of FIGS. 13-17.

FIGS. 13-17 illustrate various scatter plots that provide relevant product clusters based on intersection and commonality between the four features delineated above. FIG. 18 is a cluster silhouette graph of the clustered products.

The clustering can be used identify semantically meaningful groups of products. In this instance, blue dots in area 1302 are a normal cluster, yellow dots in area 1304 are an expensive cluster, green dots in area 1306 are a popular cluster. Negative quantities of products and prices, as well as enormous prices are considered to be outliers, along with best seller clusters. Again, these are plotted in scatter plot of FIG. 17.

Again analyzing the different products it is apparent that the most common or normal products, accounting for around two-thirds of products on a website, are relatively cheap and not bought in very significant numbers. These products are bought by a relatively diverse set of customers, with the principal distinguishing feature (vs popular products) that they are bought in lower quantities.

The expensive products comprise pretty much all products over about £5 per item. None of these are bought in large quantities. Popular items are primarily distinguished by the quantities they are bought in. (Although they have on average a more diverse set of customers buying them and there is a cutoff of on the minimum number of customers who buy popular products, i.e. no popular products are dominated by one customer).

Another interesting observation is that the country plays essentially no role in this clustering (compare top-left figure for three clusters), i.e. the three clusters have similar distribution on the distinct count of countries feature.

Additional questions that can be answered through clustering and outlier exclusion include, but are not limited to: "What clusters emerge when partitioning the features by country?"; "What clusters emerge when partitioning features by month?"; and "How are sales trending by product cluster?"

The scatter plots would also allow for detection of products at the clustering extremities. For example, it would identify a tail of popular products that relatively speaking have very few customers purchasing them. There are also a few unusually diversely popular, unusually expensive products.

Figure 19:
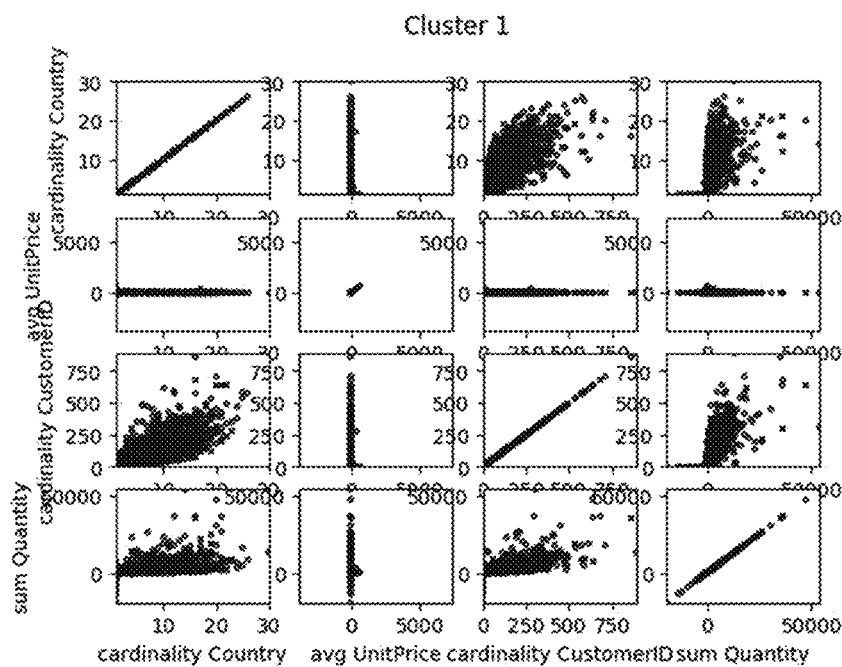
FIGS. 19-21 collectively illustrate the display of outliers in a product-based analysis.
Figure 20:
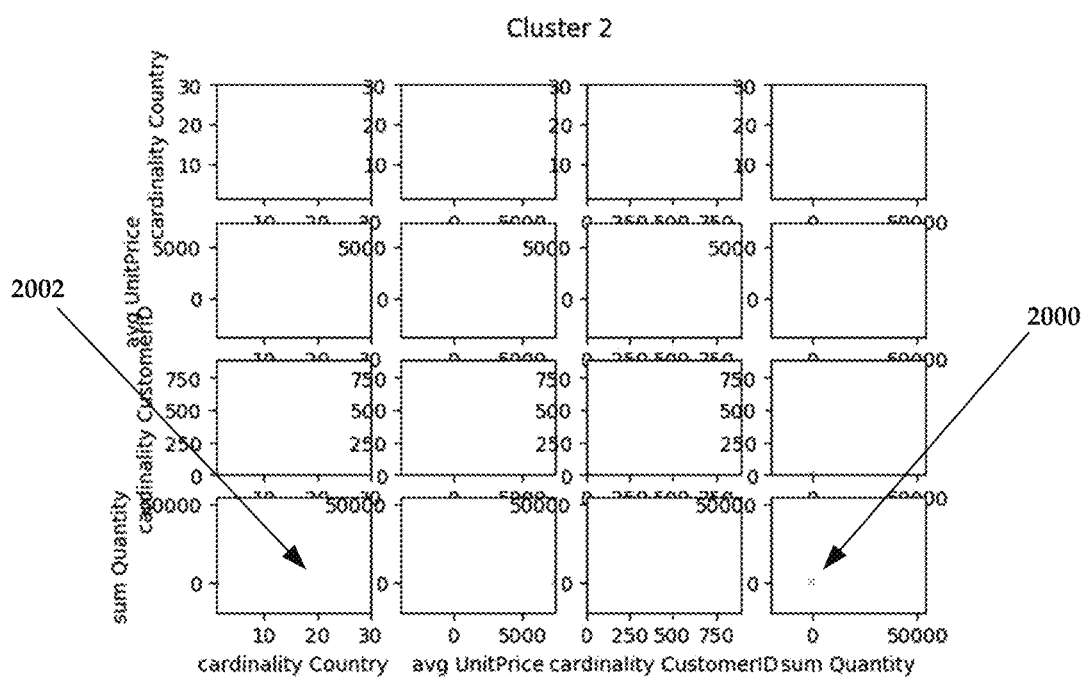
Figure 21:
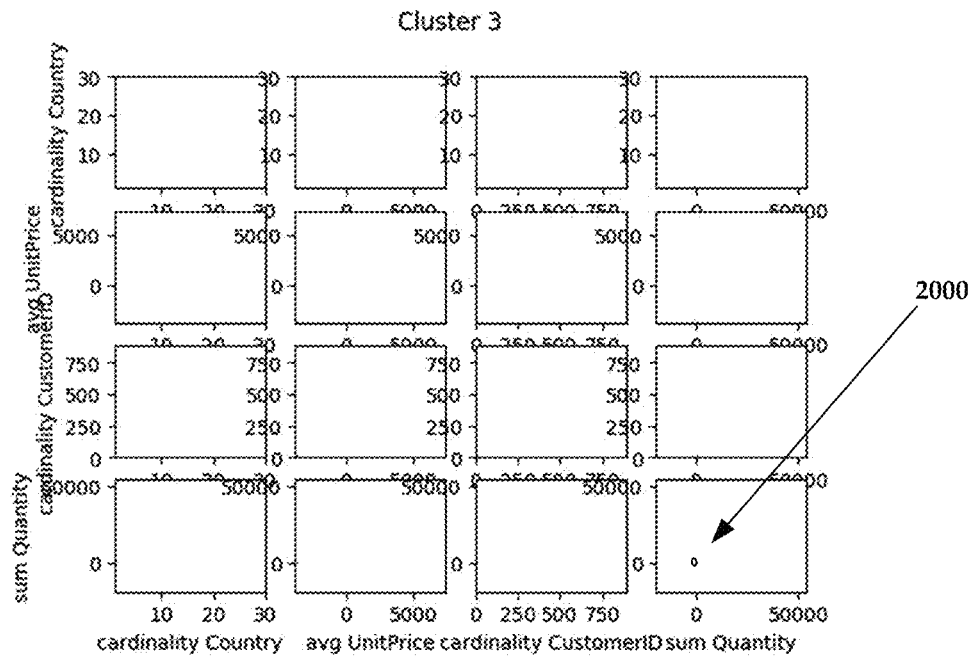
Figure 22:
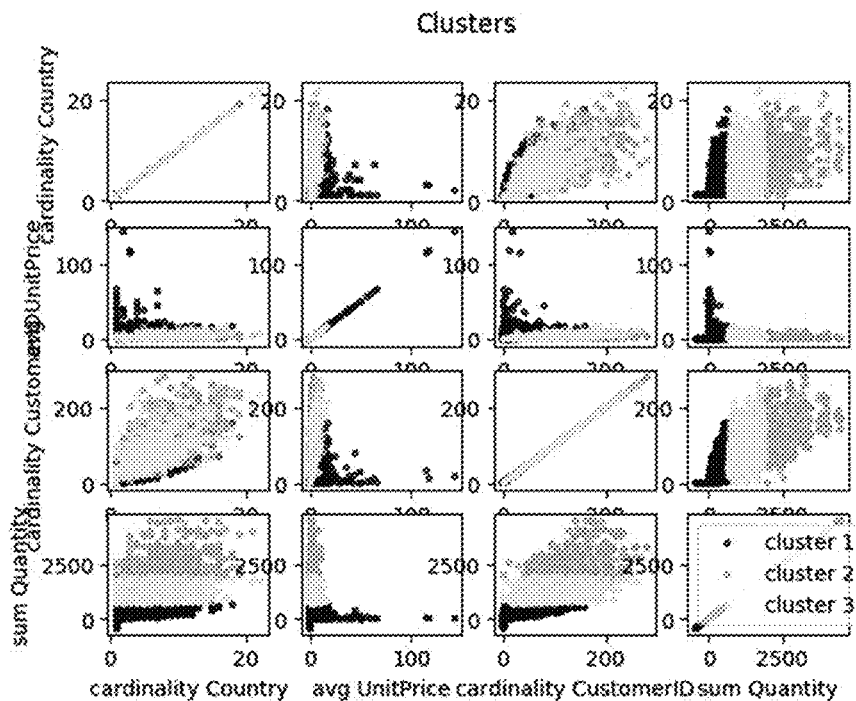
FIG. 22 is a scatter plot comprising dots that are indicative of data instances that have been scaled based on units of measure.

With respect to the filtering of outliers, FIGS. 19-21 collectively illustrate the display of outliers. For example, the k-means objective is highly susceptible to outliers. In particular, it can often be optimal to use a cluster to describe a very small (possibly one) data point which is an extreme outlier, since the increase in total dispersion including them with other points can be very large.

These single data points, such as data point or dot 2000 and dot 2002, are illustrated in FIGS. 20 and 21. Of note, dot 2002 does not appear in FIG. 21.

The clustering and outlier methodologies described herein can be improved through use of scaling in some embodiments. To be sure, many methods of formulating clustering over multiple variables are not invariant to the choice of units for those variables. In particular, when optimizing distances between cluster centers and points and these values are measured using different units for different dimensions very different clusterings can be produced.

In order to avoid this error a scaling is applied which is linear in the typical separation between observed values in each variable before clustering. For example, consider the scaling $$f' = \text{diag}\left(\frac{1}{\sigma_1}, \frac{1}{\sigma_2}, \ldots, \frac{1}{\sigma_n}\right) f.$$

If any given component of $f$ is scaled, as in $f_i \mapsto k f_i$, say by changing units, the standard deviation is similarly scaled, i.e. $\sigma_i \mapsto k \sigma_i$, and so $f'$, and therefore the clustering remains unchanged. In practice, a MAD estimate of the standard deviation is used to avoid outliers unduly impacting normalization. Without scaling one feature may dominate the distance between points and therefore it is this feature which determines the clusters which are created. Clustering without scaling shows that it is the "sum quantity" feature for which this is true, as indicated by the colored bands in the rightmost column of scatter plots in FIG. 22.

The following description provides additional details with respect to the detection of outliers in multi-dimensional data. In some embodiments, the systems and methods herein can be used to generate a data analysis pipeline, which operates on feature vectors describing a summary of the items in a data set (e.g., data instances).

In some embodiments, an example method generally includes feature generation, normalization, outlier detection, and then clustering. These steps will be discussed in greater detail below.

With respect to feature generation, a raw data set comprises a collection of documents (e.g., data instances or stream) with multiple attributes, i.e. a single message would be $m_i = x_1^{(i)}, x_2^{(i)}, \ldots, x_n^{(i)}$ for $x_1^{(i)} \in X_1, x_2^{(i)} \in X_2, \ldots, x_n^{(i)} \in X_n$. We assume that at least one say $X_i$ is categorical and is used to label distinct items to analyze. In particular, the messages can be partitioned into all those belonging to each distinct value of $X_i$.

The system can then use averages, sums, counts and so forth of the various message attributes to generate basic features that describe the distinct items to analyze. For example, if $x_j(m_i) = x_j^{(i)}$, $X_i$ labels a customer and $X_j$ labels a transaction amount then we might create a feature $f_1^{joe} = \Sigma_{\{m : x_i(m) = joe\}} X_j(m)$.

If one of the attributes, say attribute k is a time stamp then we can create time windowed features, i.e. we might partition the data by month and create one feature for each month. Returning to the example, $$f_1^{joe} = \sum_{\{m : x_i(m) = joe\}} 1\{x_k(m) = jan\} x_j(m)$$

-continued $$f_2^{joe} = \sum_{\{m:x_i(m)=joe\}} 1\{x_k(m) = feb\}x_j(m)$$

and so on. The system creates a vocabulary of transforms to allow for construction of multiple sensible features for the data in a scalable way. As well as aggregations of metric values, these would include word frequencies, character frequencies, and so forth.

The system then allows users to create feature vectors by concatenation of individual features. Finally, the system comprises a vocabulary of operations that can be apply to feature vectors, for example, the system will allow people to create outer product vectors, i.e. $[f']_{ni+j}=[f]_i \times [f]_j$ where n is the cardinality of the feature vector $f$, multiply a vector by a scalar (feature) and $[\bullet]_i$ denotes the $i^{th}$ component of a vector, and so on.

This can be done in a scalable way (using map reduce operations to create the individual features) and the resulting vectors indexed into storage, for example as an Elasticsearch™ cluster.

With respect to normalization, the system can automatically normalize feature values such that they are unit independent before to any further analysis by default (this behavior is configurable). This process uses a transform that means the resulting normalized feature values are independent of units, i.e. for the $i^{th}$ feature the system will compute a linear function in $s_i:[f]_i \to \mathbb{R}$, which measures the typical distance between values and create transformed vectors $$f' = \mathrm{diag}\left(\frac{1}{s_1}, \frac{1}{s_2}, \ldots \frac{1}{s_n}\right)f$$

With respect to outlier detection, it will be understood that outliers correspond to points that are different to the rest of the points in the point cloud. Approaches are typically distance based measuring the dissimilarity of points to their neighbors. Such approaches must be adapted to handle high dimensional points because of concentration of measure effects.

The system automatically identifies outliers in the normalized collection of vectors $F=\{f'\}$ using the following steps. The system creates a bag of fixed dimension random projections of the data $\mathcal{P}=\{P_i\}$.

The system then creates an ensemble of measures of the degree to which each vector is an outlier, which includes "distance to $k^{th}$ nearest neighbor", "total distance to k nearest neighbours", and "local outlier factor". These will collectively be denoted as the outlier functions $\mathcal{R}=\{r_j\}$.

The system them normalizes each outlier function over all bags. The system does this by fitting a probability distribution to observed values for $\{r(P_i f')\}$ for each vector $f' \in F$, each projection $P_i \in \mathcal{P}$ and each outlier function $r \in \mathcal{R}$ independently. The normalized $j^{th}$ measure of outlier-ness is then given by log of the right tail value of this distribution, i.e. $n_j=-\log(1-F_j(r_j(\bullet)))$ where $F_j$ is the cumulative distribution of the fitted probability distribution. The system then constructs an overall measure of outlier-ness as $$f' \mapsto \frac{1}{Z}\sum_{(P_i),\{n_j\}} w_{ij} n_j(P_i f')$$

where $w_{ij}=1$ and $Z=\Sigma w_{ij}=|\{P_i\}||\{n_j\}|$ i.e. the number of projections times the number of normalized outlier functions. The system then receives feedback about the goodness (e.g., accuracy) of outlier detection and learns $w_{ij}$ by gradient descent.

In some embodiments, the system extracts the dimensions that are most important for labeling a point as an outlier. The system can accomplish this in a greedy fashion by zeroing the affect of each feature in turn on all of the outlier functions and seeing which has the largest resulting decrease in the overall measure of outlier-ness for the point. For example, for the distance to the $k^{th}$ nearest neighbor, $f'_k$, the system would set $[|f'|]_i$ to $[f'_k]_i$ and recompute the compute the outlier function, for the total distance to the k nearest neighbours, $F_k$, the system would set $$[f']_i \text{ to } \frac{1}{k}\sum_{j \in F_k} [f'_j]_i$$

and recompute the outlier function and so on.

It will be understood that a given annotation of vectors as outliers and inliers {1,0}, resulting from applying a threshold to the overall measure of outlier-ness, constitutes a training set for learning a binary classifier. The system can train an interpretable classifier, for example a Bayesian Rule List, to recreate the assignment in terms of decision boundaries on individual feature values. The output of this would be presented to the user so 1) they could use online to detect outliers in real time as new data are observed, 2) understand our results better, 3) they can choose to tweak decision boundary values based on any expert knowledge.

The output of outlier detection will be interesting and useful in its own right. Applications include, but are not limited to, embodiments where users want to identify unusual items based on multiple descriptive factors, and examples include: detecting unusual trades from a collection; detecting unusual accounts; Detecting potentially faulty items, such as batteries; and performing change detection on the count of potentially unusual items to detect potential problems in a manufacturing process.

With respect to clustering, the systems and methods herein are can proceed after outliers have been removed, i.e. it will be applied to inliers. For clustering the system allows a user to explore a collection of alternative methods for clustering the data using appropriate quality measures and displaying examples of entities grouped by each method. Example methods the system supports include a variant of x-means that uses information criterion based on fitting multivariate Gaussian distributions to each cluster, random projection clustering and agglomerative clustering.

For x-means and agglomerative clustering the system will automatically choose whether or not to project onto the principle components and the number of principle components to use.

The present disclosure presents scalable fast versions of random projection clustering and agglomerative clustering that operate on sketches of the data obtained by combining nearby points into a collection of summary statistics. These statistics are chosen so the system can compute the appropriate distance metrics for the collections of points the summary statistics represent.

These systems will also support a mode where the systems cluster the data according to an ensemble of methods, and possibly bootstrap resamples, and provide tools for understanding where there is consensus in clustering and where there is disagreement. This sort of functionality can be achieved using a weighted graph whose vertices comprise the items to cluster and whose edges connect pairs of vertices corresponding to items which are in the same cluster at least once and whose weights are equal to the count of clusters in which they co-occur. For example, components of this graph, i.e. with no edges between them, are fully consistent clusters of the data. Nearly consistent clusters in the data correspond to the components after removing all edges with weight less then a specified value. For any given clustering the system can use this graph to define a measure of the degree to which each point consistently belongs to its cluster as the average weight of edges to that cluster.

These same approach, discussed above in relation to outlier detection, can be used to provide an interpretable description of the clustering. In particular, the system can train an interpretable multiclass classifier to replicate the clustering from the labeling generated by that clustering.

Example integrations with the Elasticstack™ include, but are not limited to, clustering inputs to anomaly detection so the system can automatically find peer groups for population analysis; clustering the output of anomaly detection so the system can find related groups of anomalous events; clustering data related to customer search patterns on websites (since Elasticsearch™ is widely used to serve these requests); and textual document clustering for purposes such as e-discovery or generalized document categorization and filtering.

Figure 23:
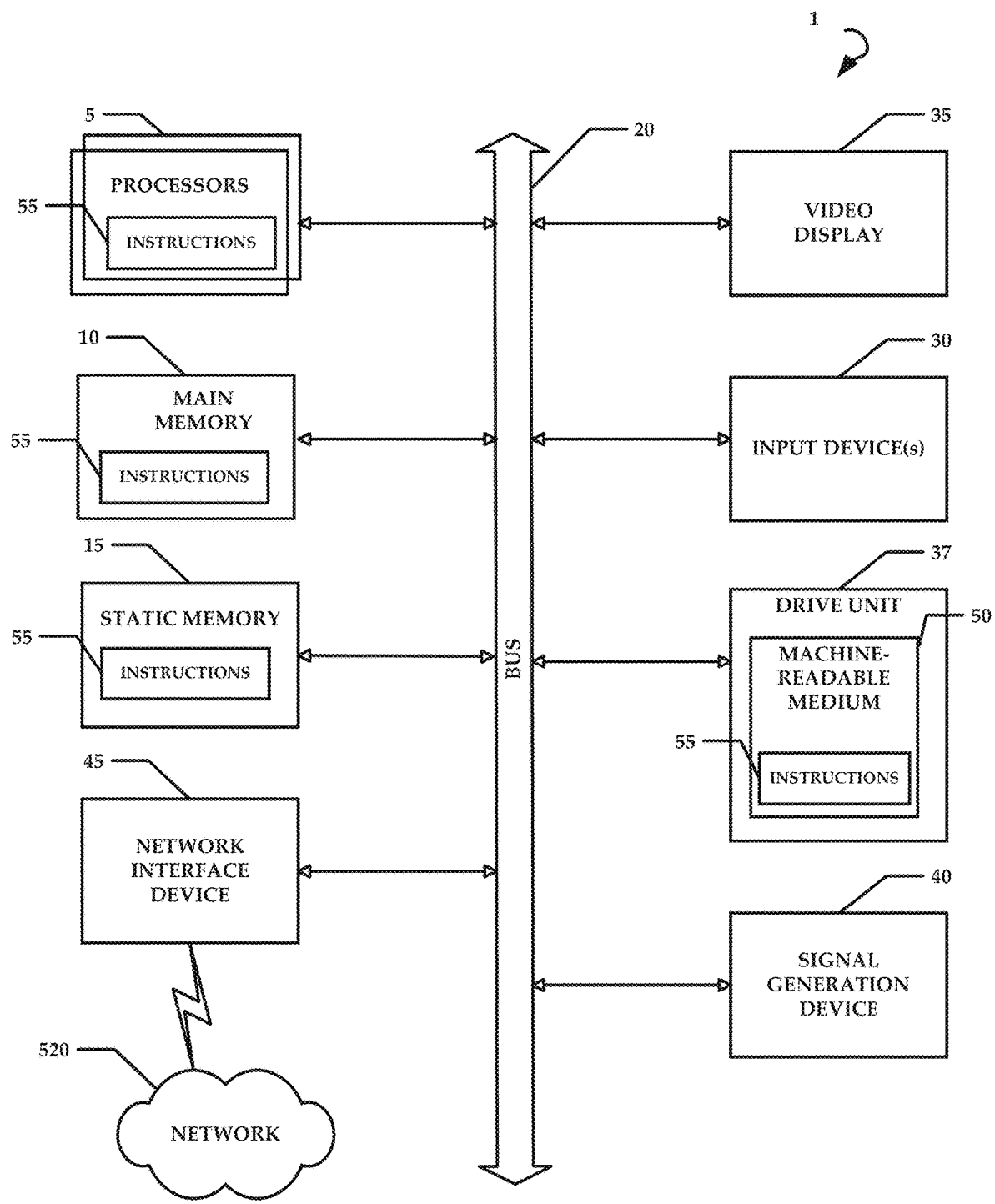
FIG. 23 is a schematic diagram of a computing system that is used to implement embodiments according to the present technology.

FIG. 23 is a diagrammatic representation of an example machine in the form of a computer system 1, within which a set of instructions for causing the machine to perform any one or more of the methodologies discussed herein may be executed. In various example embodiments, the machine operates as a standalone device or may be connected (e.g., networked) to other machines. In a networked deployment, the machine may operate in the capacity of a server or a client machine in a server-client network environment, or as a peer machine in a peer-to-peer (or distributed) network environment. The machine may be a personal computer (PC), a tablet PC, a set-top box (STB), a personal digital assistant (PDA), a cellular telephone, a portable music player (e.g., a portable hard drive audio device such as an Moving Picture Experts Group Audio Layer 3 (MP3) player), a web appliance, a network router, switch or bridge, or any machine capable of executing a set of instructions (sequential or otherwise) that specify actions to be taken by that machine. Further, while only a single machine is illustrated, the term "machine" shall also be taken to include any collection of machines that individually or jointly execute a set (or multiple sets) of instructions to perform any one or more of the methodologies discussed herein.

The example computer system 1 includes a processor or multiple processor(s) 5 (e.g., a central processing unit (CPU), a graphics processing unit (GPU), or both), and a main memory 10 and static memory 15, which communicate with each other via a bus 20. The computer system 1 may further include a video display 35 (e.g., a liquid crystal display (LCD)). The computer system 1 may also include input device(s) 30 (also referred to as alpha-numeric input device(s), e.g., a keyboard), a cursor control device (e.g., a mouse), a voice recognition or biometric verification unit (not shown), a drive unit 37 (also referred to as disk drive unit), a signal generation device 40 (e.g., a speaker), and a network interface device 45. The computer system 1 may further include a data encryption module (not shown) to encrypt data.

The drive unit 37 includes a machine-readable medium 50 (which may be a computer readable medium) on which is stored one or more sets of instructions and data structures (e.g., instructions 55) embodying or utilizing any one or more of the methodologies or functions described herein. The instructions 55 may also reside, completely or at least partially, within the main memory 10 and/or within the processor(s) 5 during execution thereof by the computer system 1. The main memory 10 and the processor(s) 5 may also constitute machine-readable media.

The instructions 55 may further be transmitted or received over a network (e.g., network 150 or network 520, see FIG. 1 and FIG. 5, respectively) via the network interface device 45 utilizing any one of a number of well-known transfer protocols (e.g., Hyper Text Transfer Protocol (HTTP)). While the machine-readable medium 50 is shown in an example embodiment to be a single medium, the term "computer-readable medium" should be taken to include a single medium or multiple media (e.g., a centralized or distributed database and/or associated caches and servers) that store the one or more sets of instructions. The term "computer-readable medium" shall also be taken to include any medium that is capable of storing, encoding, or carrying a set of instructions for execution by the machine and that causes the machine to perform any one or more of the methodologies of the present application, or that is capable of storing, encoding, or carrying data structures utilized by or associated with such a set of instructions. The term "computer-readable medium" shall accordingly be taken to include, but not be limited to, solid-state memories, optical and magnetic media, and carrier wave signals. Such media may also include, without limitation, hard disks, floppy disks, flash memory cards, digital video disks, random access memory (RAM), read only memory (ROM), and the like. The example embodiments described herein may be implemented in an operating environment comprising software installed on a computer, in hardware, or in a combination of software and hardware.

One skilled in the art will recognize that the Internet service may be configured to provide Internet access to one or more computing devices that are coupled to the Internet service, and that the computing devices may include one or more processors, buses, memory devices, display devices, input/output devices, and the like. Furthermore, those skilled in the art may appreciate that the Internet service may be coupled to one or more databases, repositories, servers, and the like, which may be utilized in order to implement any of the embodiments of the disclosure as described herein.

The corresponding structures, materials, acts, and equivalents of all means or step plus function elements in the claims below are intended to include any structure, material, or act for performing the function in combination with other claimed elements as specifically claimed. The description of the present technology has been presented for purposes of illustration and description, but is not intended to be exhaustive or limited to the present technology in the form disclosed. Many modifications and variations will be apparent to those of ordinary skill in the art without departing from the scope and spirit of the present technology. Exemplary embodiments were chosen and described in order to best explain the principles of the present technology and its practical application, and to enable others of ordinary skill in the art to understand the present technology for various embodiments with various modifications as are suited to the particular use contemplated.

Aspects of the present technology are described above with reference to flowchart illustrations and/or block diagrams of methods, apparatus (systems) and computer programs according to embodiments of the present technology. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

The flowchart and block diagrams in the Figures illustrate the architecture, functionality, and operation of possible implementations of systems, methods and computer program products according to various embodiments of the present technology. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

In the following description, for purposes of explanation and not limitation, specific details are set forth, such as particular embodiments, procedures, techniques, etc. in order to provide a thorough understanding of the present invention. However, it will be apparent to one skilled in the art that the present invention may be practiced in other embodiments that depart from these specific details.

Reference throughout this specification to "one embodiment" or "an embodiment" means that a particular feature, structure, or characteristic described in connection with the embodiment is included in at least one embodiment of the present invention. Thus, the appearances of the phrases "in one embodiment" or "in an embodiment" or "according to one embodiment" (or other phrases having similar import) at various places throughout this specification are not necessarily all referring to the same embodiment. Furthermore, the particular features, structures, or characteristics may be combined in any suitable manner in one or more embodiments. Furthermore, depending on the context of discussion herein, a singular term may include its plural forms and a plural term may include its singular form. Similarly, a hyphenated term (e.g., "on-demand") may be occasionally interchangeably used with its non-hyphenated version (e.g., "on demand"), a capitalized entry (e.g., "Software") may be interchangeably used with its non-capitalized version (e.g., "software"), a plural term may be indicated with or without an apostrophe (e.g., PE's or PEs), and an italicized term (e.g., "N+1") may be interchangeably used with its non-italicized version (e.g., "N+1"). Such occasional interchangeable uses shall not be considered inconsistent with each other.

Also, some embodiments may be described in terms of "means for" performing a task or set of tasks. It will be understood that a "means for" may be expressed herein in terms of a structure, such as a processor, a memory, an I/O device such as a camera, or combinations thereof. Alternatively, the "means for" may include an algorithm that is descriptive of a function or method step, while in yet other embodiments the "means for" is expressed in terms of a mathematical formula, prose, or as a flow chart or signal diagram.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

It is noted at the outset that the terms "coupled," "connected", "connecting," "electrically connected," etc., are used interchangeably herein to generally refer to the condition of being electrically/electronically connected. Similarly, a first entity is considered to be in "communication" with a second entity (or entities) when the first entity electrically sends and/or receives (whether through wireline or wireless means) information signals (whether containing data information or non-data/control information) to the second entity regardless of the type (analog or digital) of those signals. It is further noted that various figures (including component diagrams) shown and discussed herein are for illustrative purpose only, and are not drawn to scale.

While specific embodiments of, and examples for, the system are described above for illustrative purposes, various equivalent modifications are possible within the scope of the system, as those skilled in the relevant art will recognize. For example, while processes or steps are presented in a given order, alternative embodiments may perform routines having steps in a different order, and some processes or steps may be deleted, moved, added, subdivided, combined, and/or modified to provide alternative or sub-combinations. Each of these processes or steps may be implemented in a variety of different ways. Also, while processes or steps are at times shown as being performed in series, these processes or steps may instead be performed in parallel, or may be performed at different times.

While various embodiments have been described above, it should be understood that they have been presented by way of example only, and not limitation. The descriptions are not intended to limit the scope of the invention to the particular forms set forth herein. To the contrary, the present descriptions are intended to cover such alternatives, modifications, and equivalents as may be included within the spirit and scope of the invention as defined by the appended claims and otherwise appreciated by one of ordinary skill in the art. Thus, the breadth and scope of a preferred embodiment should not be limited by any of the above-described exemplary embodiments.

What is claimed is:

1. A method comprising:
receiving a stream of data instances;
applying a vector value function $f: \mathcal{S} \to \mathcal{V}$ for $\mathcal{V} \in \mathbb{R}^n$ to a plurality of multi-dimensional attribute sets of the data instances to create feature vectors, wherein the data instances are pairs having a categorical attribute and a value;
automatically normalizing each component of the feature vectors corresponding to the data instances using a maximum absolute deviation (MAD) calculation within a dimension;
computing a collection of multiple affine random projections of the feature vectors;
performing outlier detection on each of the projected feature vectors;
applying one or more normalized measures of outlier factors to the projected feature vectors;
associating weights with pairs, each of the pairs comprising a projection of the projected feature vectors and a normalized measure of an outlier factor, and using the weights, the projection feature vectors, and the normalized measure of the outlier factor to generate an overall measure of outlier-ness;
training a rule based classifier using labeling generated by applying a threshold to the overall measure of outlierness for each of the data instances; and
applying the rule based classifier to data instances to automatically determine outliers in data instances.

2. The method according to claim 1, wherein the weight is unit initialized and is selectively adjustable via gradient descent based on user feedback.

3. The method according to claim 1, further comprising:
receiving an input stream comprising the data instances;
extracting the outliers and singularities;
grouping two or more of the data instances into one or more groups based on correspondence between multi-dimensional attribute sets of the data instances; and
displaying grouped data instances in a plurality of clustering maps on an interactive graphical user interface, wherein each of the plurality of clustering maps is based on a unique clustering type.

4. The method according to claim 3, further comprising generating feature scores for the grouped data instances that were not identified as the outliers and singularities.

5. The method according to claim 4, further comprising comparing the feature scores to anomaly score thresholds.

6. The method according to claim 5, further comprising identifying when any of the feature scores of the multi-dimensional attribute sets of the data instances are above the anomaly score thresholds.

7. The method according to claim 6, wherein the multi-dimensional attribute sets are obtained from and are indicative of a computing environment.

8. The method according to claim 3, wherein the categorical attributes are one or more of user, system ID, and login location.

9. The method according to claim 3, further comprising targeting a message to the grouped data instances that remain.

10. The method according to claim 3, further comprising generating the interactive graphical user interface that comprises a plurality of scatter plots, wherein each of the scatter plots includes dots that correspond to the grouped data instances.

11. The method according to claim 10, further comprising highlighting a selected one of the grouped data instances in each of the plurality of scatter plots when a dot of the one of the grouped data instances of one of the plurality of scatter plots is selected.

12. The method according to claim 1, wherein the outlier factor comprises a local outlier factor.

13. The method according to claim 1, wherein the outlier factor comprises distance to kth nearest neighbor.

14. The method according to claim 1, wherein the outlier factor comprises distance to sum distance to k nearest neighbors.

15. A method comprising:
receiving an input stream comprising data instances, each of the data instances comprising a plurality of multi-dimensional attribute sets of data instances;
identifying and removing any of outliers and singularities in the data instances by:
applying a vector value function $f: \mathcal{S} \to \mathcal{V}$ for $\mathcal{V} \in \mathbb{R}^n$ to the multi-dimensional attribute sets of the data instances to create feature vectors, wherein the data instances are pairs having a categorical attribute and a value;
automatically normalizing each of the multi-dimensional attribute sets of the feature vectors corresponding to the data instances using percentile ranges within a dimension;
computing a collection of multiple affine random projections of the feature vector
performing outlier detection on each of the feature vectors;
applying one or more normalized measures of outlier factors to the projected feature vectors;
associating weights with pairs, each of the pairs comprising a projection of the projected feature vectors and a normalized measure of an outlier factor, and using the weights, the projection feature vectors, and the normalized measure of the outlier factor to generate an overall measure of outlier-ness;
applying a threshold to the overall measure of outlierness;
grouping two or more of the data instances into one or more groups based on correspondence between the multi-dimensional attribute sets; and
displaying the grouped data instances that are not extracted in a plurality of clustering maps on an interactive graphical user interface, wherein each of the plurality of clustering maps is based on a unique clustering type.

16. The method according to claim 15, wherein the weight is unit initialized and is selectively adjustable via gradient descent based on user feedback.

17. A system, comprising:
a processor; and
a memory for storing executable instructions, the processor executing the executable instructions to:
receive data instances, each of the data instances comprising a plurality of multi-dimensional attribute sets;

identify any of outliers and singularities in the data instances, wherein the identification includes:
  applying a vector value function $f\colon \mathcal{S} \to \mathcal{V}$ for $\mathcal{V} \in \mathbb{R}^n$ to a plurality of multi-dimensional attribute sets of data instances having a length, received from an input, to create feature vectors, wherein the data instances are pairs having a categorical attribute and a value;
  automatically normalizing each of component of the feature vectors corresponding to the data instances using a maximum absolute deviation (MAD) calculation within a dimension;
  computing a collection of multiple affine random projections of the feature vectors;
  performing outlier detection on each of the projected feature vectors;
  applying one or more normalized measures of outlier factors to the projected feature vectors;
  associating weights with pairs, each of the pairs comprising a projection of the projected feature vectors and a normalized measure of an outlier factor, and using the weights, the projection feature vectors, and the normalized measure of the outlier factor to generate an overall measure of outlier-ness;
  training a rule based classifier using labeling generated by applying a threshold to the overall measure of outlier-ness for each of the data instances; and
  applying the rule based classifier to data instances to automatically determine outliers in data instances;
group two or more of the data instances into one or more groups based on correspondence between the multi-dimensional attribute sets;
and
generate an interactive graphical user interface that displays the grouped data instances that are not extracted in a plurality of clustering maps, wherein each of the plurality of clustering maps is based on a unique clustering type.

18. The system according to claim 17, wherein the processor executes the executable instructions to calculate feature scores for the multi-dimensional attribute sets; and compare the calculate feature scores to anomaly score thresholds.

19. The system according to claim 18, wherein the processor executes the executable instructions to identify when feature scores of any of the multi-dimensional attribute sets of the data instances are above any of the anomaly score thresholds.

20. The system according to claim 19, wherein the multi-dimensional attribute sets are obtained from and are indicative of a computing environment.

* * * * *